US006810475B1

(12) United States Patent
Tardieux

(10) Patent No.: US 6,810,475 B1
(45) Date of Patent: Oct. 26, 2004

(54) PROCESSOR WITH PIPELINE CONFLICT RESOLUTION USING DISTRIBUTED ARBITRATION AND SHADOW REGISTERS

(75) Inventor: Jean-Louis Tardieux, Cagnes-sur-Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/411,434

(22) Filed: Oct. 1, 1999

(30) Foreign Application Priority Data

| Oct. 6, 1998 | (EP) | ............................................ | 98402455 |
| Oct. 6, 1998 | (EP) | ............................................ | 98402466 |
| Mar. 8, 1999 | (EP) | ............................................ | 99400551 |

(51) Int. Cl.$^7$ .............................................. G06F 9/38
(52) U.S. Cl. ....................................... 712/219; 712/217
(58) Field of Search ................................. 712/216–219

(56) References Cited

U.S. PATENT DOCUMENTS

| 4,287,561 A | * | 9/1981 | Liptay ......................... 712/217 |
| 5,073,855 A | * | 12/1991 | Staplin et al. ............... 712/217 |
| 5,333,176 A | * | 7/1994 | Burke et al. ................. 455/412 |

FOREIGN PATENT DOCUMENTS

| EP | 0 649 085 A | 4/1995 |
| EP | 0 653 703 A | 5/1995 |
| WO | WO 93 20505 A | 10/1993 |
| WO | WO 93 22722 A | 11/1993 |

OTHER PUBLICATIONS

Nelson, Victor P. et al., Digital Logic Circuit Analysis & Design, 1995, Prentic–Hall, Inc., pp. 173–196.*
Smith, J.E. and G.S. Sohi, The Microarchitecture of Superscalar Processors, Dec. 1995, Proceedings of the IEEE, vol. 83, No. 12, pp. 1609–1624.*

Paver, N.C., et al.; Register Locking in an Asynchronous Microprocessor, IEEE Proc. Of the Int'l Conf. On Computer Design: VL in Computers and Processors, Cambridge, MA, Oct. 11–14, 1992, pp. 351–355.
Shimamura, K., et al.; A Superscalar RISC Processor With Pseudo Vector Processing Feature, IEEE Int'l Conf. On Computer Design: VLSI in Computers and Processors, Austin, Oct. 2–4, 1995, pp. 102–109.
Kogge, P.; The Architecture of Pipelined Computers, 1981, Hemisphere Pub. Corp., Washington, US XP002096561, pp. 220–225.

* cited by examiner

*Primary Examiner*—Eddie Chan
*Assistant Examiner*—Tonia L. Meonske
(74) *Attorney, Agent, or Firm*—Robert D. Marshall, Jr.; W. James Brady, III; Frederick J. Telecky, Jr.

(57) ABSTRACT

A processing engine including a processor pipeline 820 with a number of pipeline stages, a number of resources and a pipeline protection mechanism. The pipeline protection mechanism includes, for each protected resource, interlock detection circuitry 1402 for anticipating and/or detecting access conflicts for that resource between the pipeline stages. An output of the interlock detection circuitry is connected to reservation and filtering circuitry 1404 for selection of a shadow register. If a shadow register is available, shadow management circuitry 1406 generates corresponding control signals 1410, 1412 to a set of shadow registers 1400. By writing into a selected register, a pipeline conflict is resolved. At a later cycle, a delayed write to a corresponding target register restores the pipeline. Conflicts that cannot be resolved are merged by merge circuitry 1440 to form stall control signals for controlling the selective stalling of the pipeline to avoid the resource access conflicts. The resources could, for example, be registers in register file 832 or parts (fields) within registers. By providing arbitration logic within the interlock detection circuitry for each resource, an embodiment of the invention effectively enables a distribution of the control logic needed to anticipate potential resource access conflicts, and allows selectively stalling of the pipeline to avoid the conflicts from actually occurring.

13 Claims, 19 Drawing Sheets

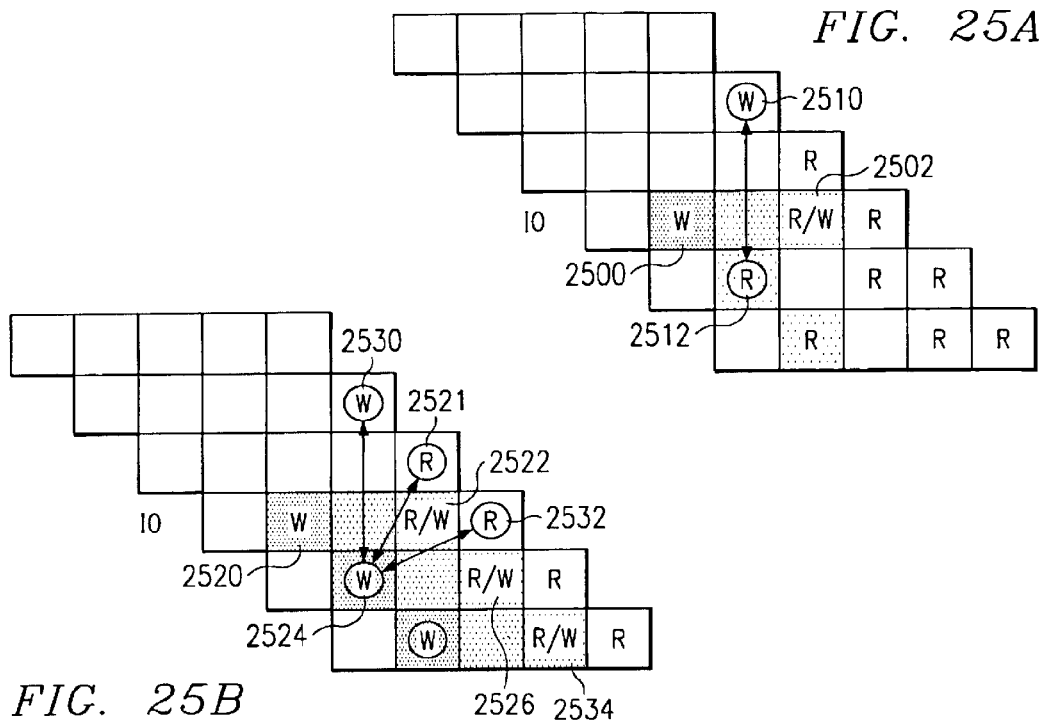
FIG. 25A
FIG. 25B
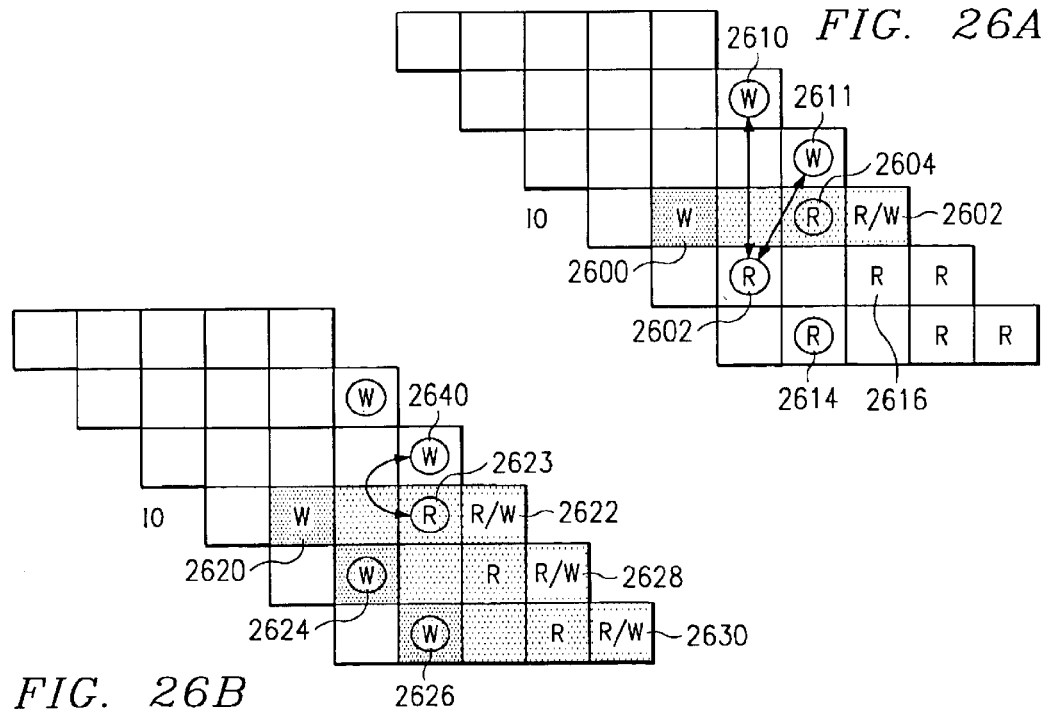
FIG. 26A
FIG. 26B

PROCESSOR WITH PIPELINE CONFLICT RESOLUTION USING DISTRIBUTED ARBITRATION AND SHADOW REGISTERS

This application claims priority to S.N. 99400551.0, filed in Europe on Mar. 8, 1999 S.N. 98402466.1, filed in Europe on Oct. 6, 1998 and S.N. 98402455.4, filed in Europe on Oct. 6, 1998.

FIELD OF THE INVENTION

The present invention relates to pipeline processor design, more especially to protecting a processor pipeline against conflicts.

BACKGROUND OF THE INVENTION

Typically, modern processing engines, such as are found in digital signal processors (DSP's) or microprocessors employ a pipelined architecture in order to improve processing performance. A pipelined architecture means that various stages of instruction processing are performed sequentially such that more than one instruction will be at different stages of processing within the pipeline at any one time.

Although a pipelined architecture does allow higher processing speed than would be possible if the processing of one instruction were to be completed before the processing of another could be started, this does lead to significant complications regarding potential conflicts in operation. Conflicts may occur between resource accesses, for example in a situation where a second instruction attempts to access a register or a part of a register before a first instruction has finished operations on that register, whereby the second instruction might receive invalid data.

Such potential conflicts are often termed "data hazards". Examples of possible data hazards are in cases of, for example:

read after write (ex: ARx=ARy followed by*ARx=k16)
write after read (ex: ARx=ARy followed by mar(ARy= P16))
write after write (ex: ARx=ARy followed by mar(ARx= P16))

Various techniques for hardware pipeline protection are known in the art.

One example is termed "scoreboarding". With scoreboarding each register or field can have pending writes and reads qualified with their execution phase using a table, or scoreboard. However, such an approach can be complex to handle and expensive in terms of logic overhead and, as a consequence, in power consumption. Particularly in processing engines designed for portable applications or applications powered other than by the mains (e.g., battery or other alternatively powered applications), such an approach is undesirable. Moreover, a scoreboarding approach rapidly becomes unwieldy when the processing engine has a large instruction set and/or a parallel processing architecture.

Other approaches can employ read/write queuing. However, such an approach is unsuitable where there is a wide variety of pipeline fields and/or sources of resource accesses. Moreover, such an approach can also rapidly become complex to handle and expensive in terms of logic overhead and power consumption.

A further approach can employ attaching a resource encoding to instructions within the pipeline. However, such an approach can also suffer from disadvantages similar to those described above.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in, but not exclusively, applications such as mobile telecommunications applications, it is desirable to provide ever increasing DSP performance while keeping power consumption as low as possible.

There is, therefore, a need for a different approach to resource conflict management within a pipeline for avoiding data hazards, which does not suffer from the disadvantages of the prior approaches described above.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with an aspect of the invention, there is provided a processing engine including a processor pipeline with a plurality of pipeline stages, a plurality of resources and a pipeline protection mechanism. The pipeline protection mechanism includes interlock circuitry for anticipating access conflicts for each protected resource of the plurality of resources between the pipeline stages. An output of the interlock detection circuitry is controllably connected to a set of shadow registers. The set of shadow registers are interconnected with the processor pipeline such that a data item from a first pipeline stage can be redirected into a selected shadow register in response to an access conflict anticipated by the interlock circuitry so that a resource access conflict is resolved without stalling the processor pipeline.

The resources could, for example, be registers or parts (e.g. fields) of registers.

The interlock circuitry comprises interlock detection circuitry that is operable to anticipate access conflicts for all of the protected resources and that is operable to form a stall vector signal. Reservation and filtering circuitry is connected to receive the stall vector signal and is operable to select an available shadow register from the set of shadow registers in response to the stall vector signal. Shadow management circuitry is connected to the reservation and filtering circuitry. The shadow management circuitry has an output signal controllably connected to the set of shadow registers.

Preferably, the arbitration logic for each of the resources is derived from a generic arbitration logic determined for the pipeline. The generic function may itself be embodied in the integrated circuit as generic arbitration logic capable of handling simultaneous occurrence of all envisaged conflicts. Each of the arbitration logic blocks may fully embody the generic arbitration function, but will typically only embody different special forms of the generic arbitration function. The generic arbitration function provides a logical definition of all of the potential, or theoretical, conflicts which could occur between respective pipeline stages. In practice, it may not be physically possible for all of the theoretical conflicts to occur for each of the resources, since the resources concerned may not be accessible at all of the pipeline stages being monitored. However, configuring the respective arbitration logic blocks from a single, generic function simplifies the design of the logic for the individual resources, and provides consistent performance and testability.

The processing engine will typically include pipeline control logic for controlling the stages of the pipeline. This pipeline control logic can be connected to receive the stall control signals derived, or output, from the arbitration logic. Output merge logic can be provided for merging the output of each arbitration logic to form stall control signals for controlling the selective stalling of the pipeline to avoid the resource access conflicts.

The access information can relate to pending accesses. It can also relate to current access. Indeed, a current access decoding stage can be connected to receive current access information from the pipeline to derive current access information for respective protected resources, the arbitration logic for a protected resource being connected to receive current access information for that protected resource as well as pending access information.

The processing engine can be in the form of a digital signal processor. Alternatively, it could be in the form of a microprocessor, or any other form of processing engine employing a pipelined architecture. The processing engine can be implemented in the form of an integrated circuit.

A particular application for a processing engine in accordance with the present invention is in the form of a wireless telecommunications device, in particular a portable telecommunications device such as, for example, a mobile telephone, where low power consumption and high processing performance is required.

In accordance with another aspect of the invention there is provided a method of protecting a pipeline in a processing engine, which processing engine includes a processor pipeline with a plurality of pipeline stages and a plurality of resources. The method comprises the steps of: separately arbitrating, for respective protected resources, to anticipate access conflicts between the pipeline stages for the each resource, and redirecting a data item from a first pipeline stage into a selected shadow register in response to an anticipated access conflict so that a resource access conflict is resolved without stalling the processor pipeline.

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which:

FIG. 25A is a timing diagram illustrating a two cycle write delay and resulting read redirections from shadow registers in which potential conflicts are killed;

FIG. 25B is a timing diagram illustrating a two cycle write delay in a loop that requires two shadow registers;

FIG. 26A is a timing diagram illustrating a three cycle write delay and resulting read redirections from shadow registers in which potential conflicts are killed;

FIG. 26B is a timing diagram illustrating a three cycle write delay in a loop such that three shadow registers are required;

DESCRIPTION OF PARTICULAR EMBODIMENTS

Although the invention finds particular application to Digital Signal Processors (DSPs), implemented, for example, in an Application Specific Integrated Circuit (ASIC), it also finds application to other forms of processors.

The basic architecture of an example of a processor according to the invention will now be described. Processor 100 is a programmable fixed point DSP core with variable instruction length (8 bits to 48 bits) offering both high code density and easy programming. Architecture and instruction set are optimized for low power consumption and high efficiency execution of DSP algorithms as well as pure control tasks, such as for wireless telephones, for example. Processor 100 includes emulation and code debugging facilities.

Figure 1:
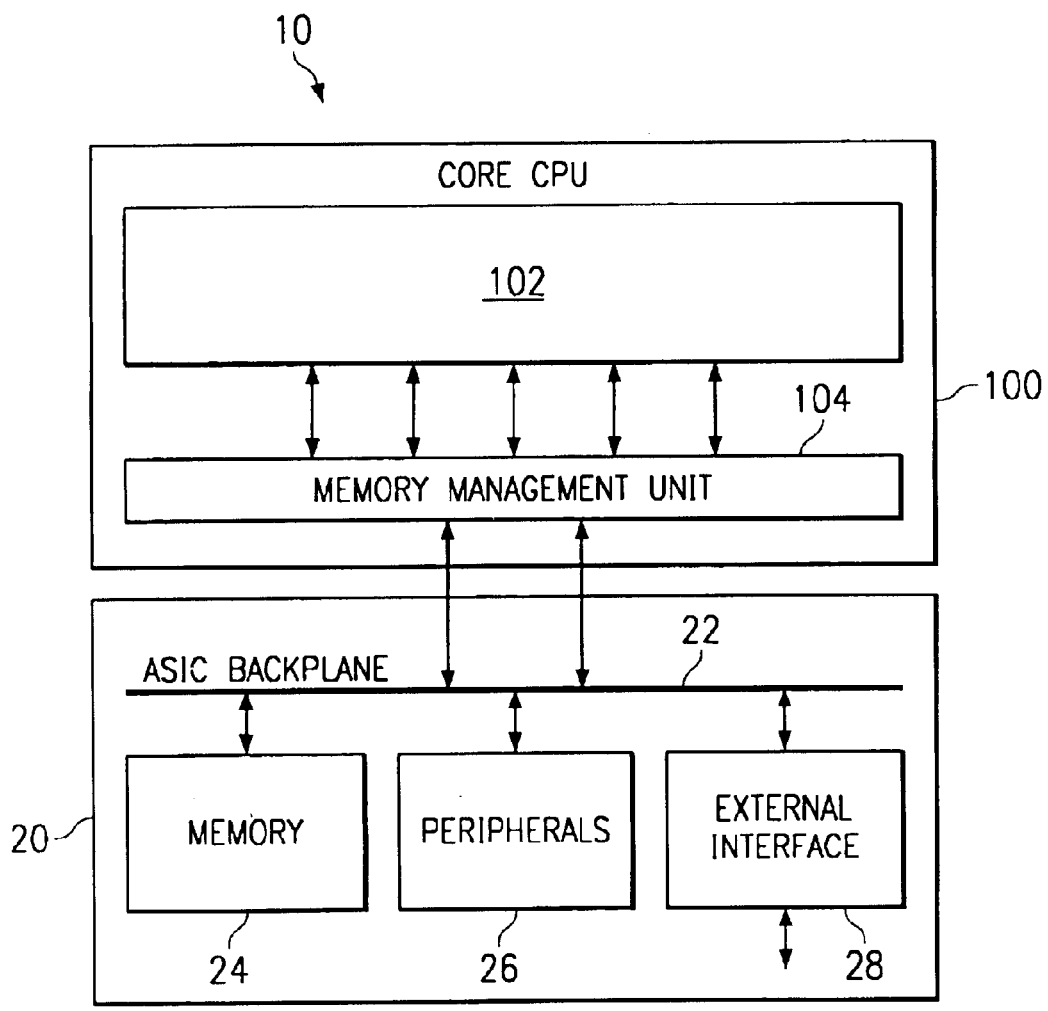
FIG. 1 is a schematic block diagram of a processor in accordance with an embodiment of the invention.

FIG. 1 is a schematic overview of a digital system 10 in accordance with an embodiment of the present invention. The digital system includes a processor 100 and a processor backplane 20. In a particular example of the invention, the digital system is a Digital Signal Processor System 10 implemented in an Application Specific Integrated Circuit (ASIC). In the interest of clarity, FIG. 1 only shows those portions of microprocessor 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 100 relevant to an embodiment of the present invention are explained in sufficient detail herein below, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned U.S. Pat. No. 6,658,578, which is incorporated herein by reference.

As shown in FIG. 1, processor 100 forms a central processing unit (CPU) with a processor core 102 and a memory interface unit 104 for interfacing the processor core 102 with memory units external to the processor core 102.

Processor backplane 20 comprises a backplane bus 22, to which the memory management unit 104 of the processor is connected. Also connected to the backplane bus 22 is an instruction memory 24, peripheral devices 26 and an external interface 28.

It will be appreciated that in other examples, the invention could be implemented using different configurations and/or different technologies. For example, processor 100 could form a first integrated circuit, with the processor backplane 20 being separate therefrom. Processor 100 could, for example be a DSP separate from and mounted on a backplane 20 supporting a backplane bus 22, peripheral and external interfaces. The processor 100 could, for example, be a microprocessor rather than a DSP and could be implemented in technologies other than ASIC technology. The processor or a processor including the processor could be implemented in one or more integrated circuits.

Figure 2:
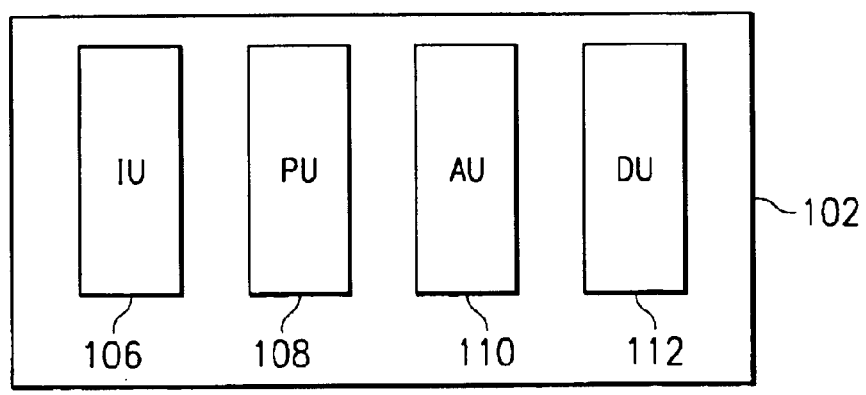
FIG. 2 is a schematic diagram of a core of the processor of FIG. 1.

FIG. 2 illustrates the basic structure of an embodiment of the processor core 102. As illustrated, this embodiment of the processor core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
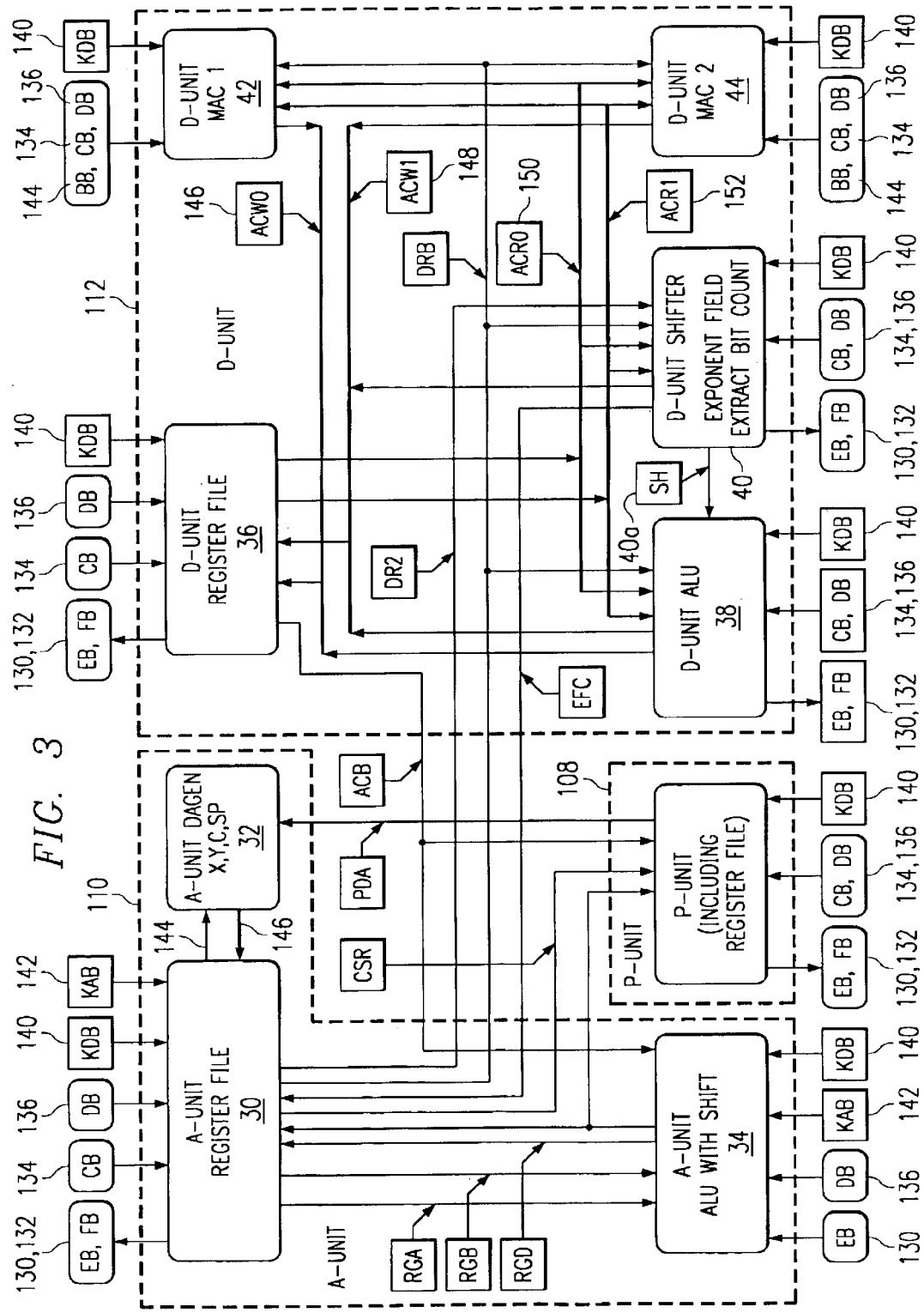
FIG. 3 is a more detailed schematic block diagram of various execution units of the core of the processor of FIG. 1.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose buses (EB,DB) 130,136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by buses RGA and RGB for receiving address and data register contents and by a bus RGD for forwarding address and data registers in the register file 30.

In accordance with the illustrated embodiment of the invention, D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to buses (EB, FB, CB, DB and KDB) 130, 132, 134, 136 and 140, and the MAC units 42 and 44 are coupled to the buses (CB, DB, KDB) 134, 136, 140 and Data Read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write buses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read buses (ACR0, ACR1) 150, 152. The D Unit ALU 38 and D Unit shifter 40 are also coupled to sub-units of the A Unit 108 via various buses labeled EFC, DRB, DR2 and ACB.

Figure 4:
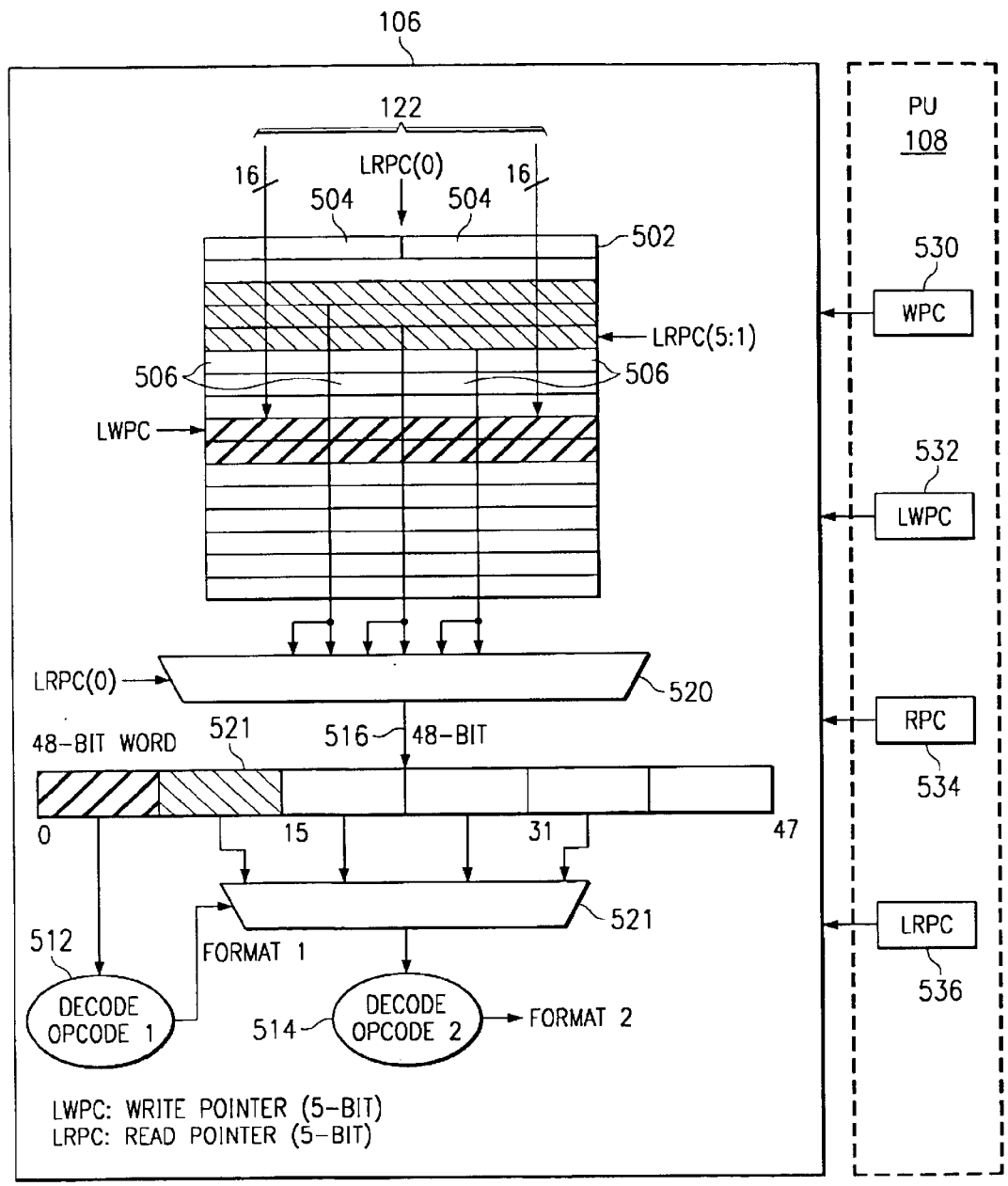
FIG. 4 is schematic diagram of an instruction buffer queue and an instruction decoder controller of the processor of FIG. 1.

Referring now to FIG. 4, there is illustrated an instruction buffer unit 106 in accordance with the present embodiment, comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder/s 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder/s 512/514.

In this embodiment, the instructions are formed into a 48 bit word and are loaded into the instruction decoders 512, 514 over a 48 bit bus 516 via multiplexers 520 and 521. It will be apparent to a person of ordinary skill in the art that the instructions may be formed into words comprising other than 48-bits, and that the present invention is not to be limited to the specific embodiment described above.

For presently preferred 48-bit word size, bus 516 can load a maximum of 2 instructions, one per decoder, during any one instruction cycle for parallel execution. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decode thereof. The multiplexing associated with the alignment of instructions with byte boundaries is performed in multiplexors 520 and 521.

Two instructions can be put in parallel if one of the two instructions is provided with a parallel enable bit. The hardware support for such type of parallelism is called the parallel enable mechanism. Likewise, two instructions can be put in parallel if both of the instructions make single data memory accesses (Smem, or dbl(lmem)) in indirect mode. The hardware support for such type of parallelism is called the soft dual mechanism.

Figure 5:
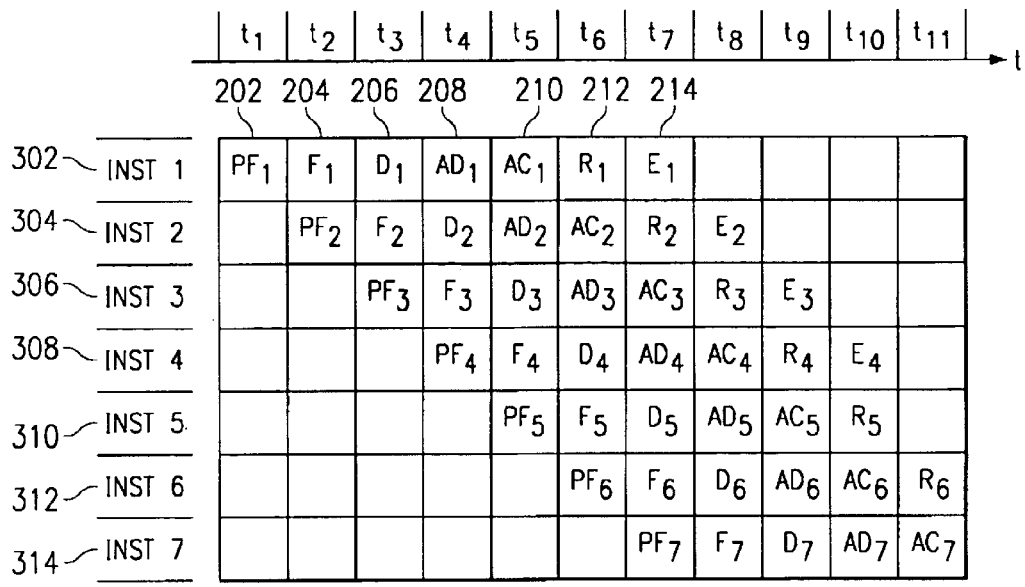
FIG. 5 is a schematic representation of the core of the processor for explaining the operation of the pipeline of the processor.

Processor core 102 executes instructions through a 7 stage pipeline, the respective stages of which will now be described with reference to Table 1 and to FIG. 5. The processor instructions are executed through a seven stage pipeline regardless of where the execution takes place (A unit or D unit). In order to reduce program code size, a C compiler, according to one aspect of the present invention, dispatches as many instructions as possible for execution in the A unit, so that the D unit can be switched off to conserve power. This requires the A unit to support basic operations performed on memory operands.

TABLE 1

Processor Pipeline Operation for a Single Cycle Instruction With No Memory Wait States

| Pipeline stage | | Description. |
|---|---|---|
| P0 | Pre-Fetch | Address program memory via the program address bus PAB. |
| P1 | Fetch | Read program memory through the program bus PB. Fill instruction buffer queue with the 4 bytes fetched in program memory. |
| P2 | Decode | Read instruction buffer queue (6 bytes) Decode instruction pair or single instruction. Dispatch instructions on Program Flow Unit (PU), Address Data Flow Unit (AU), and Data Computation Unit (DU). |
| P3 | Address | Data address computation performed in the 3 address generators located in AU: Pre-computation of address to be generated in: direct SP/DP relative addressing mode. indirect addressing mode via pointer registers. Post-computation on pointer registers in: indirect addressing mode via pointer registers. Program address computation for PC relative branching instructions: goto, call, switch. |
| P4 | Access | Read memory operand address generation on BAB, CAB, DAB buses. Read memory operand on CB bus (Ymem operand). |
| P5 | Read | Read memory operand on DB (Smem, Xmem operand), on CB and DB buses (Lmem operand), on BB (coeff operand) Write memory operand address generation on EAB and FAB buses. |
| P6 | Execute | Execute phase of data processing instructions executed in A unit and D unit. Write on FB bus (Ymem operand). Write Memory operand on EB (Smem, Xmem operand), on EB and FB buses (Lmem operand). |

The first stage of the pipeline is a PRE-FETCH (P0) stage 202, during which stage a next program memory location is addressed by asserting an address on the address bus (PAB) 118 of a memory interface 104.

In the next stage, FETCH (P1) stage 204, the program memory is read and the I Unit 106 is filled via the PB bus 122 from the memory interface unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in A Unit 110 or P Unit 108 respectively.

In an ACCESS (P4) stage 210, the address of a read operand is generated and the memory operand, the address of which has been generated in a DAGEN Y operator with a Ymem indirect addressing mode, is then READ from indirectly addressed Y memory (Ymem).

The next stage of the pipeline is the READ (P5) stage 212 in which a memory operand, the address of which has been generated in a DAGEN X operator with an Xmem indirect addressing mode or in a DAGEN C operator with coefficient address mode, is READ. The address of the memory location to which the result of the instruction is to be written is generated.

Finally, there is an execution EXEC (P6) stage 214 in which the instruction is executed in either the A Unit 110 or the D Unit 112. The result is then stored in a data register or accumulator, or written to memory for Read/Modify/Write instructions. Additionally, shift operations are performed on data in accumulators during the EXEC stage.

Processor 100's pipeline is protected. This significantly improves the C compiler performance since no NOP's instructions have to be inserted to meet latency requirements. It also makes the code translation from a prior generation processor to a latter generation processor much easier.

A pipeline protection basic rule used in processor 100 is as follows: if a write access has been initiated before the on going read access but not yet completed and if both accesses share the same resource then extra cycles are inserted to allow the write completion and execute next instruction with the updated operands; but for emulation, a single step code execution must behave exactly as free running code execution.

The basic principle of operation for a pipeline processor will now be described with reference to FIG. 5. As can be seen from FIG. 5, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 5 for a seven stage pipeline a total of 7 instructions may be processed simultaneously. For all 7 instructions 302, 304, 306, 308, 310, 312, 314, FIG. 5 shows them all under process in time period $T_7$. Such a structure adds a form of parallelism to the processing of instructions.

Figure 6:
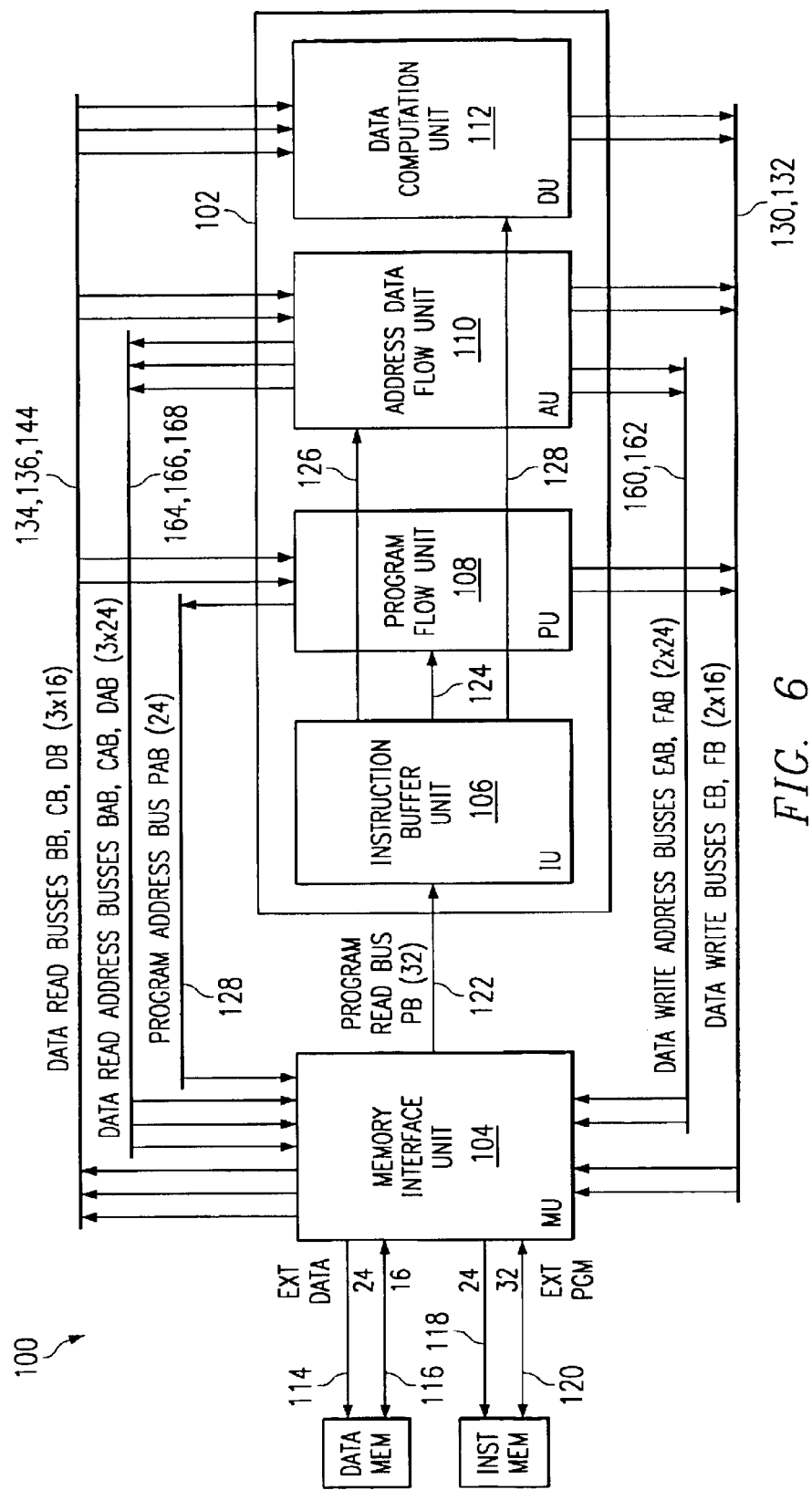
FIG. 6 is a block diagram of the processor illustrating a memory management unit interconnected memory.

As shown in FIG. 6, the present embodiment of the invention includes a memory interface unit 104 which is coupled to external program storage memory 150 via a 24 bit address bus 118 and a 32 bit bi-directional data bus 120. Additionally, the memory interface unit 104 is coupled to data memory units 151 via a 24 bit address bus 114 and a bi-directional 16 bit data bus 116. The memory interface unit 104 is also coupled to the I Unit 106 of the machine processor core 102 via a 32 bit program read bus (PB) 122. The P Unit 108, A Unit 110. and D Unit 112 are coupled to the memory interface unit 104 via data read and data write buses and corresponding address buses. The P Unit 108 is further coupled to a program address bus 128.

More particularly, the P Unit 108 is coupled to the memory interface unit 104 by a 24 bit program address bus 128, the two 16 bit data write buses (EB, FB) 130, 132, and the two 16 bit data read buses (CB, DB) 134, 136. The A Unit 110 is coupled to the memory interface unit 104 via two 24 bit data write address buses (EAB, FAB) 160, 162, the two 16 bit data write buses (EB, FB) 130, 132, the three data read address buses (BAB, CAB, DAB) 164, 166, 168 and the two 16 bit data read buses (CB, DB) 134, 136. The D Unit 112 is coupled to the memory interface unit 104 via the two data write buses (EB, FB) 130, 132 and three data read buses (BB, CB, DB) 144, 134, 136.

FIG. 6 represents the passing of instructions from the I Unit 106 to the P Unit 108 at 124, for forwarding branch instructions for example. Additionally, FIG. 6 represents the passing of data from the I Unit 106 to the A Unit 110 and the D Unit 112 at 126 and 128 respectively.

Figure 7:
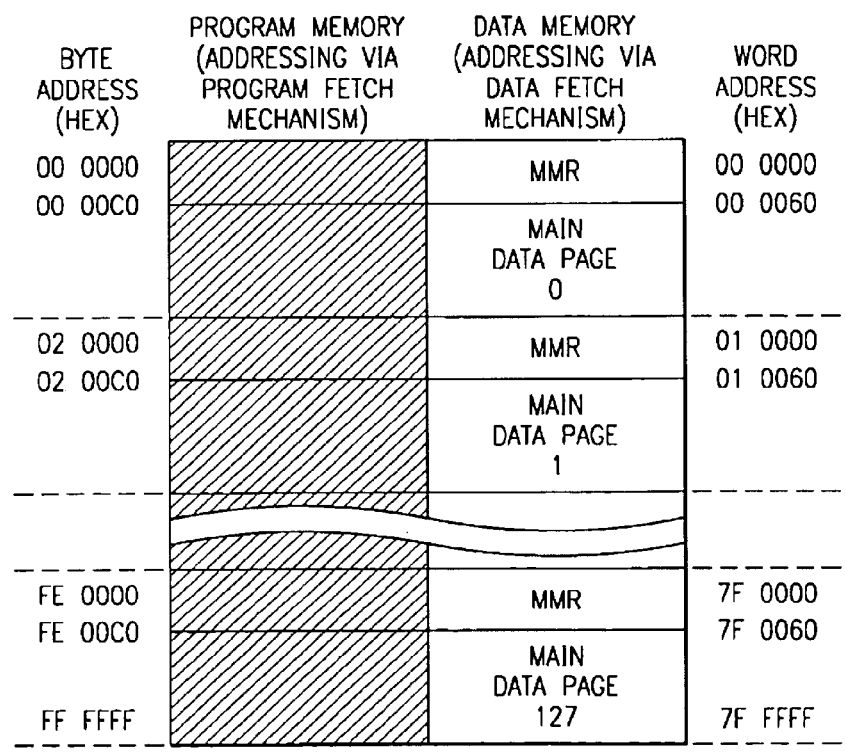
FIG. 7 shows the unified structure of Program and Data memory spaces of the processor.

Processor 100 is organized around a unified program/data space, as illustrated in FIG. 7. A program pointer is internally 24 bits and has byte addressing capability, but only a 22 bit address is exported to memory since program fetch is always performed on a 32 bit boundary. However, during emulation for software development, for example, the full 24 bit address is provided for hardware breakpoint implementation. Data pointers are 16 bit extended by a 7 bit main data page and have word addressing capability. Software can define up to 3 main data pages, as follows:

| MDP | Direct access | Indirect access | CDP |
|---|---|---|---|
| MDP05 | — | Indirect access | AR[0–5] |
| MDP67 | — | Indirect access | AR[6–7] |

A stack is maintained and always resides on main data page 0. CPU memory mapped registers are visible from all the pages.

Various aspects of processor 100 are summarized in Table 2.

TABLE 2

Summary of Improved Processor 100

Very Low Power programmable processor
Parallel execution of instructions, 8-bit to 48-bit instruction format
Seven stage pipeline (including pre-fetch)

| | |
|---|---|
| Instruction buffer unit highlight | 32 × 16 buffer size Parallel Instruction dispatching Local Loop |
| Data computation unit highlight | Four 40 bit generic (accumulator) registers Single cycle 17 × 17 Multiplication-Accumulation (MAC) 40 bit ALU, "32 + 8" or "(2 × 16) + 8" Special processing hardware for Viterbi functions Barrel shifter |

TABLE 2-continued

Summary of Improved Processor 100

| | |
|---|---|
| Program flow unit highlight | 32 bits/cycle program fetch bandwidth<br>24 bit program address<br>Hardware loop controllers (zero overhead loops)<br>Interruptible repeat loop function<br>Bit field test for conditional jump<br>Reduced overhead for program flow control |
| Data flow unit highlight | Three address generators, with new addressing modes<br>Three 7 bit main data page registers<br>Two Index registers<br>Eight 16 bit pointers<br>Dedicated 16 bit coefficients pointer<br>Four 16 bit generic registers<br>Three independent circular buffers<br>Pointers & registers swap<br>16 bits ALU with shift |
| Memory Interface highlight | Three 16 bit operands per cycle<br>32 bit program fetch per cycle<br>Easy interface with cache memories |
| C compiler | |
| Algebraic assembler | |

A difficulty with the operation of a pipeline is that different instructions may need to make access to one and the same resource. Quite often, a first instruction will be operable to modify a resource, for example a register or a part, for example a field, of a register and a second instruction may then need to access that resource. If the instructions were being processed separately with the processing of the second instruction only being commenced when the processing of the first instruction has finished, this would not create a conflict. However, in a pipelined architecture, there is a possibility that a second instruction could access the resource before the first instruction has finished with it, unless measures are undertaken to prevent this.

Such potential conflicts are often termed "data hazards". Examples of possible data hazards are in cases of, for example:

Read after Write (e.g.: ARx=ARy followed by *ARx= k16)

Write after Read (e.g.: ARx=ARy followed by mar(ARy= P16))

Write after Write (e.g.: ARx=ARy followed by mar(ARx= P16))

Figure 8A:
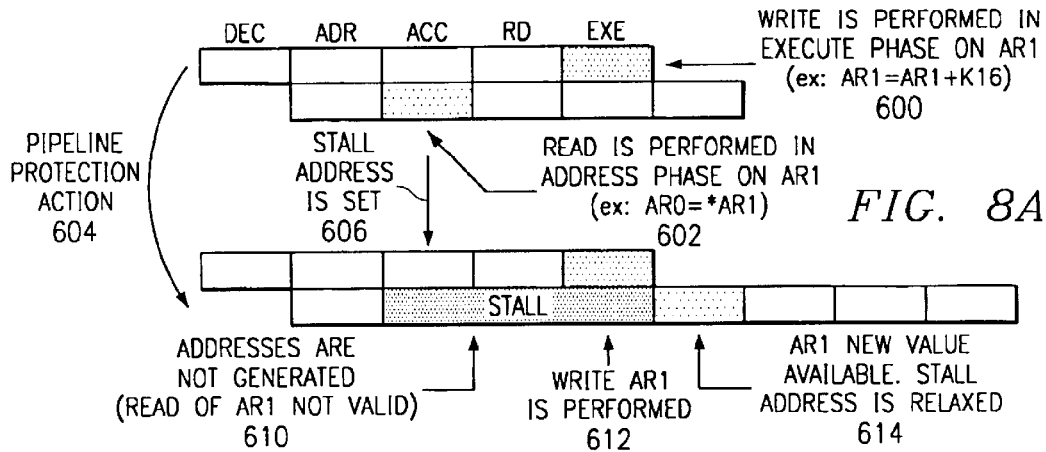
FIG. 8A is an example of a read after write hazard.

FIG. 8A represents an example of a pipeline protection action for a Read After Write (RAW). Step 600 represents a write performed by a first instruction in an execute phase (EXE) on a register AR1 (e.g. AR1=AR0+K16). Step 602 represents a read performed in the address phase (ADR) on AR1 (e.g. AC0=*AR1). A pipeline protection action (604) comprises setting a stall 606 for the address phase, whereby the addresses for the read are not generated at 610 (the read of AR1 is not valid) until after the write to AR1 is performed at 612, the new AR1 value being available and the stall for the address phase being relaxed (removed) at 614.

Figure 8B:
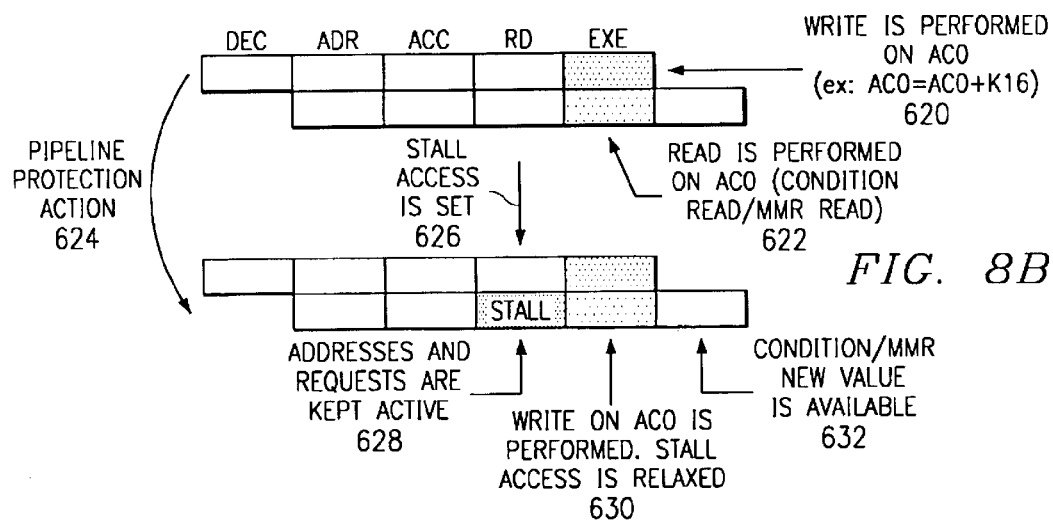
FIG. 8B is another example of a read after write hazard.

FIG. 8B represents another example of a pipeline protection action for a Read After Write (RAW). Step 620 represents a write performed by a first instruction in an execute phase (EXE) on a register AR0 (e.g. AR0=AC0+K16). Step 622 represents a read performed in the read phase (RD) on AR0 (e.g. Condition Read/Memory Mapped Register (MMR) read). A pipeline protection action (624) comprises setting a stall 626 for the access phase (ACC), by prediction, whereby the addresses and requests are kept active at 628, a write on AC0 is performed at 630 and the stall of the access phase is relaxed (removed) and the Condition/MMR new value is available at 632. Alternatively, a stall could be inserted during the read phase at 630 instead of at the access phase.

Figure 9:
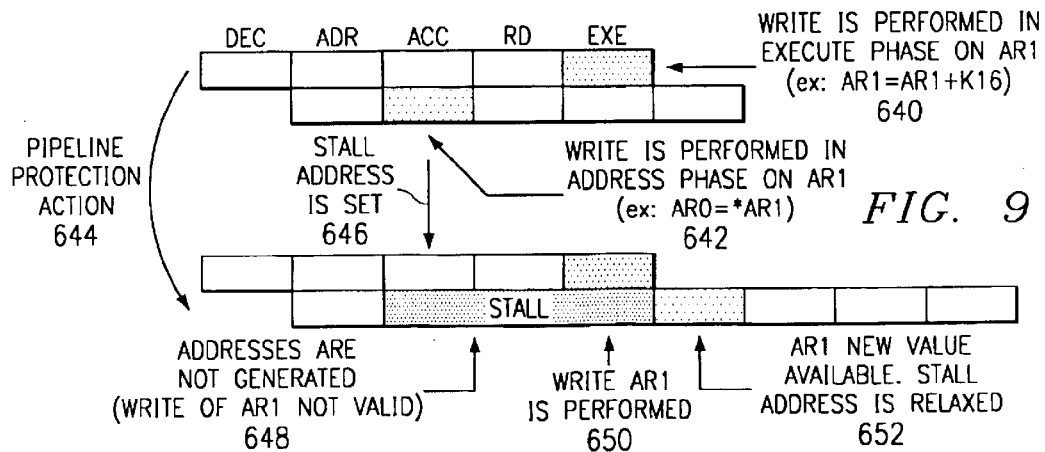
FIG. 9 is an example of a write after write hazard.

FIG. 9 represents an example of a pipeline protection action for a Write After Write (WAW). Step 640 represents a write performed by a first instruction in an execute phase (EXE) on a register AR1 (e.g. AR1=AR0+K16). Step 642 represents a write performed in the address phase (ADR) on AR1 (e.g. AC0=*AR1+). A pipeline protection action (644) comprises setting a stall 646 for the address phase, whereby the addresses for the second write to AR1 are not generated at 648 (the write to AR1 is not allowed) until after the first write to AR1 is performed at 650, the new AR1 value being available and the stall for the address phase being relaxed (removed) at 652.

Figure 10A:
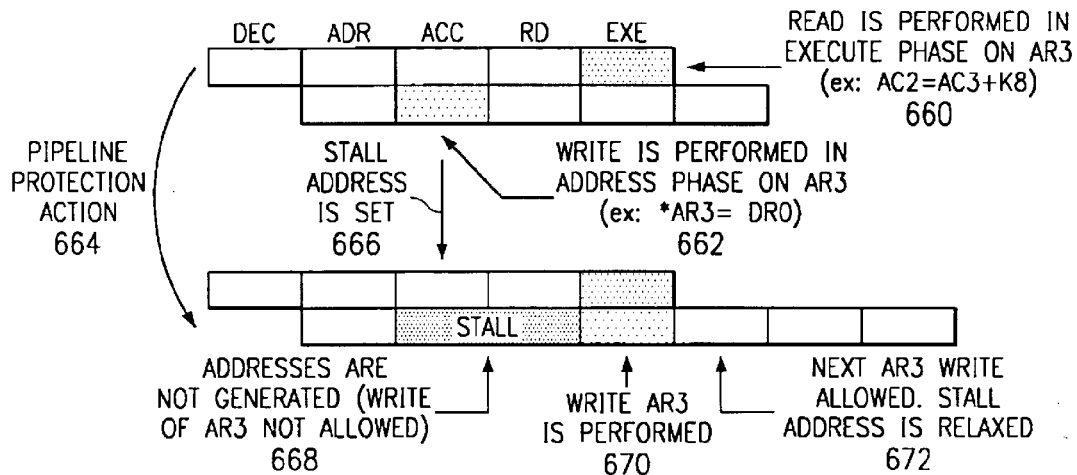
FIG. 10A is one example of a write after read hazard.

FIG. 10A represents an example of a pipeline protection action for a Write After Read (WAR). Step 660 represents a read performed by a first instruction in a execute phase (EX) on a register AR3 (e.g. AC2=AR3+K8). Step 662 represents an write performed in the address phase (ADR) on AR3 (e.g. *AR3+DR0). A pipeline protection action (664) comprises setting a stall 666 for the address phase, whereby the addresses for the write to AR3 are not generated at 668 (the write to AR3 is not allowed) until the read of AR3 is performed at 670, the AR3 write being allowed during the same phase at 670. The read and write of AR3 can be performed in the same phase at 670 because the read gets the "old" value of AR3. The stall for the address phase being relaxed (removed) at 672.

Figure 10B:
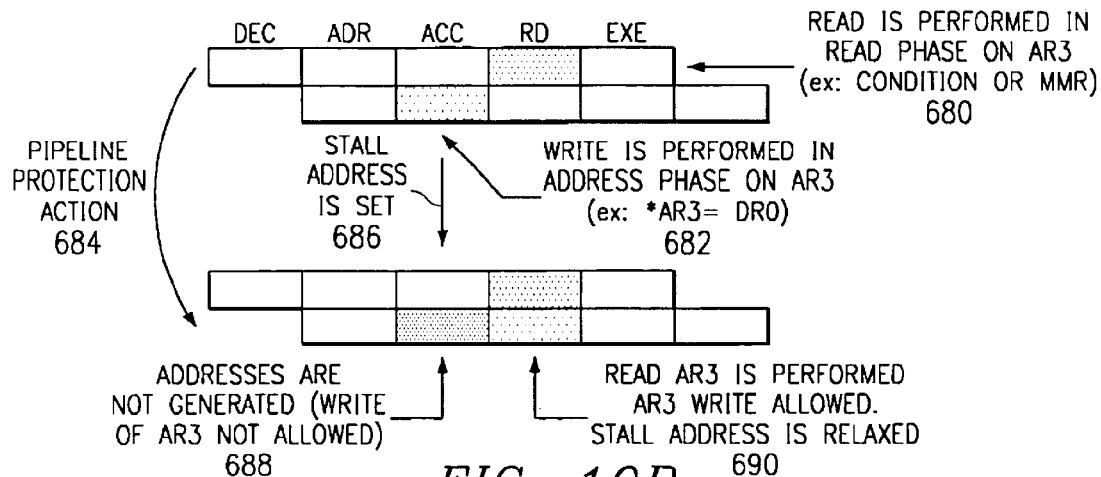
FIG. 10B is another example of a write after read hazard.

FIG. 10B represents another example of a pipeline protection action for a Write After Read (WAR). Step 680 represents a read performed by a first instruction in a read phase (RD) on a register AR3 (e.g. Condition or MMR). Step 682 represents a write performed in the address phase (ADR) on AR3 (e.g. *AR3+DR0). A pipeline protection action (684) comprises setting a stall 686 for the address phase, whereby the addresses for the write to AR3 are not generated at 688 (the write to AR3 is not allowed) until the read of AR3 is performed at 690, the write to AR3 then being allowed and the stall for the address phase being relaxed (removed).

Figure 11:
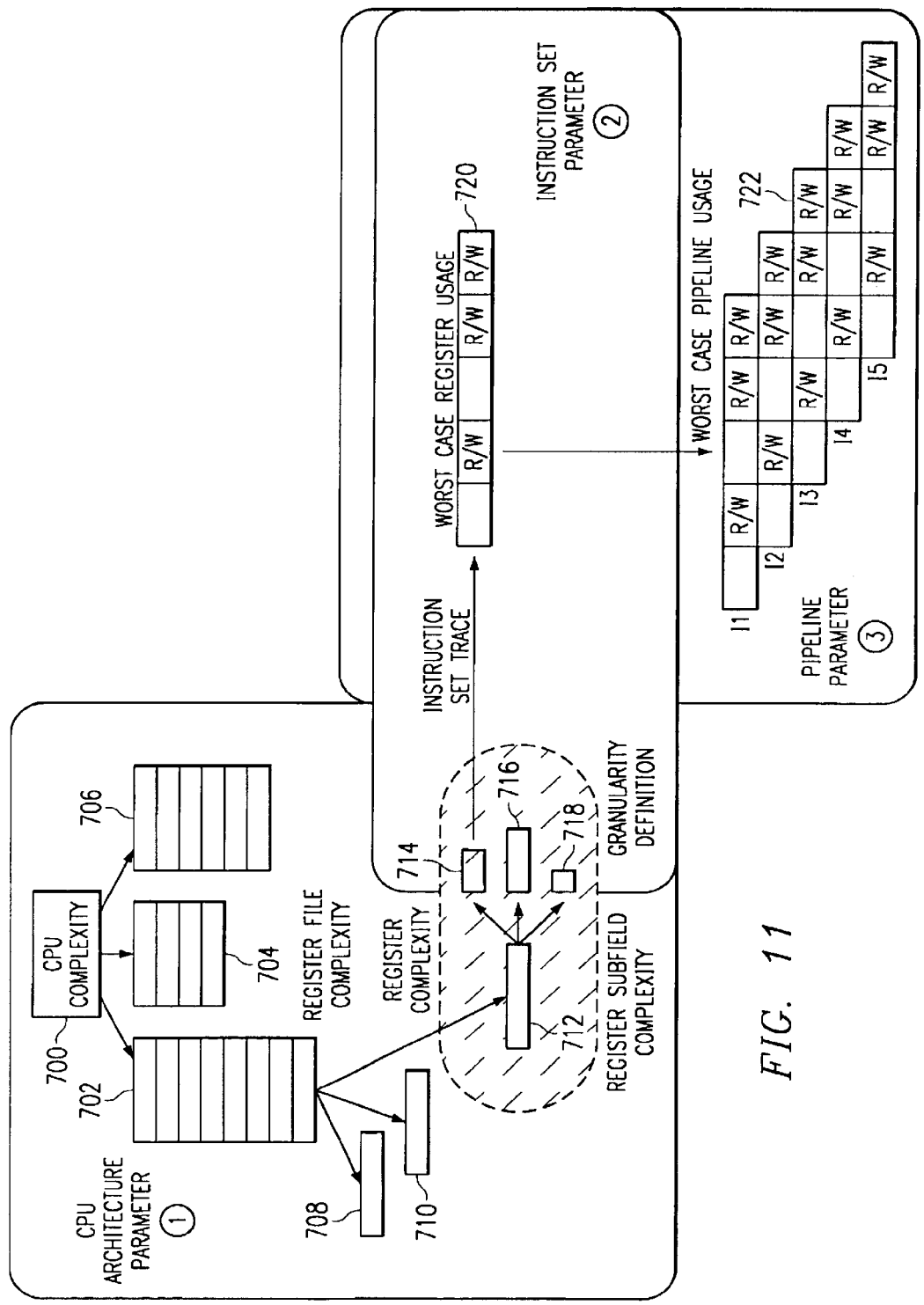
FIG. 11 illustrates possible conflicts at various pipeline stages.

FIG. 11 is a schematic of an approach adopted for determining a definition of a generic arbitration function of all possible resource access conflicts of the pipeline. The generic arbitration function is an abstract concept which underpins and simplifies the design of each arbitration logic, which can all be implemented as special forms of the generic function. Logic in which the generic arbitration function is embedded may also be included in the processing engine. The generic arbitration function can also aid circuit testing at the end of the circuit design. Although described in the context of the present embodiment, this approach could be used for other processor architectures.

Referring to FIG. 11, in an initial step (1) the organization (700) of the processing engine as a whole is divided into groups of registers, or register files (e.g. 702, 704, 706). In the present example, three register files exist for the program unit, or control flow (CF), for the data unit (DU) and for the address unit (AU). Each of the register files comprises a number of registers N(i) (e.g., 708, 710, 712). These registers can form the resources to be protected. As well as, or instead of, protecting whole registers, it may be desired to protect parts of (or fields within) registers (e.g. 714, 716, 718). FIG. 11 represents this definition of resource granularity. Accordingly, a protected resource could, for example, be a register or a field within a register.

For each protected resource, an analysis of the worst possible resource usage is derived in step 2. Different instructions will provide different ways of reading from and writing to a resource, for example. As shown in FIG. 11 in respect of register field 714, the pipeline stages represented at 720 in which read/write operations could be performed for that resource are stages P3, P5 and P6. In other words, the worst case resource usage for this resource is in respect of pipeline stages P3, P5 and P6. The above accesses can be classified in terms of their execution stages.

The pipeline depth (e.g., here pipeline stages P2, P3, P4, P5 and P6) has to be taken into account in step 3 to consider the instruction execution overlap, as represented at 722 for five instructions I1, I2, I3, I4 and I5.

Figure 12:
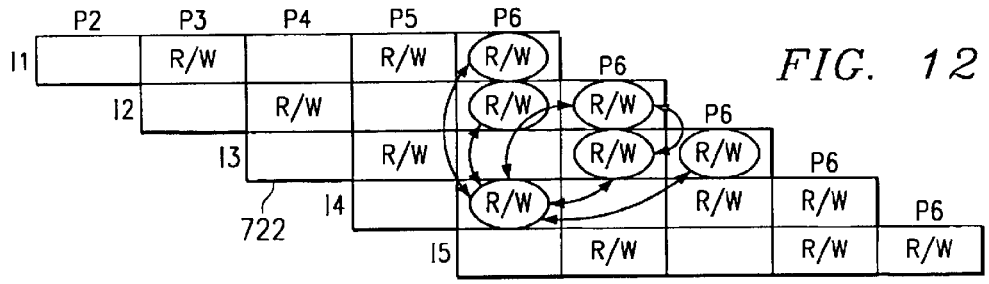
FIG. 12 illustrates the derivation of a generic arbitration function definition process.

All potential data hazards are considered as represented by the arrows in FIG. 12, which Figure is a schematic diagram illustrating potential conflicts at different stages of a pipeline. FIG. 12 illustrates the five stages P2–P6 of FIG. 5 for each of the four instructions I0, I1, I2 and I3 and I4.

Figure 13:
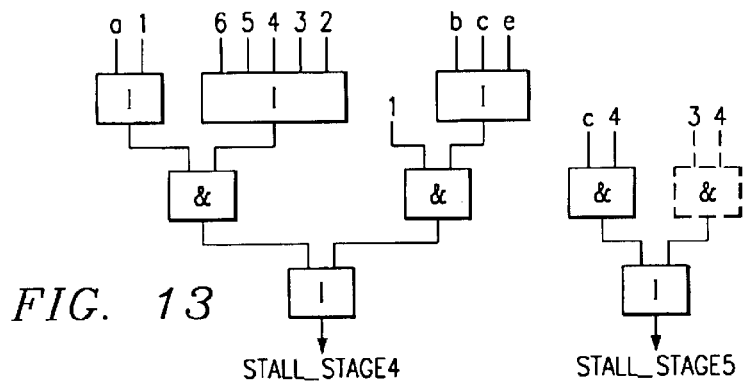
FIG. 13 is a schematic diagram of generic arbitration logic.

From the consideration of the data hazards found, a generic arbitration function can be derived as illustrated in FIG. 13, this generic arbitration function defining relationships between current and pending accesses. The generic arbitration function can then be used to control the selective stalling of the pipeline to avoid data hazards. The generic logic is representative of all potential resource access conflicts for the pipeline. From an analysis of the potential conflict problems represented schematically in FIG. 12, the following signals susceptible to resulting in a conflict can be identified, namely:

a: current read stage P3
b: pending (stage P4) read stage P6
c: pending (stage P4) read stage P5
d: current read stage P5
e: pending (stage P5) read stage P6
f: current read stage P6
1: current write stage P3
   2: pending (stage P4) write stage P6
3: pending (stage P4) write stage P5
4: pending (stage P5) write stage P6
5: current write stage P5
6: current write stage P6

The logic for interpreting these signals and forming a signal stall-stage 4 for stalling the ADR (P3) stage and a signal stall-stage 5 for stalling the ACC (P4) stage is illustrated in FIG. 13. It will be noted that signals "d" and "f" are not shown in FIG. 13. These signals are not, however, needed as all potential conflicts dealing with a 7-stage read are solved by anticipating using the pending signals "b" and "e". Accordingly, these signals do not need to be represented in FIG. 13 as any conflicts related thereto can already be predicted.

It will thus be appreciated that in general the generic function will have a large number of variable operands and that each arbitration logic will be a special form or sub-set of the generic function with a lower degree of degeneracy, i.e. with a number of the operands which are variable in the generic function being fixed.

Once determined, the generic arbitration function can be used to implement the circuit design of each of the arbitration logic blocks, which are all definable as special forms of the generic arbitration function. The full generic form is not needed for the arbitration logic of each individual resource, since, for each of the resources, it will in general be impossible for some of the conflicts envisaged by the generic arbitration function to occur.

Generic arbitration logic embodying the generic arbitration function need only be provided in the processing engine if full protection is desired against simultaneous occurrence of all envisaged conflicts.

Another aspect of the present invention is illustrated with reference to FIGS. 9, 10A and 10B. Using a dynamic reordering approach for write cycles, such as score-boarding or queuing, is difficult in the microprocessor of the present embodiment. This is due to the fact that to be able to modify the instruction execution order the full resource usage of the issued instructions must be known. In this embodiment, any register can be accessed by an instruction through an indirect address. This address is known (usable) by the hardware only from the stage 5. Therefore, most instructions having an addressing mode can' he reordered. However, it has now been discovered that another techniques may be used to minimize the Interlock stall penalty. According to an aspect of the present invention, a technique that is disclosed herein dynamically re-directs the destination of a conflicting write to a set of shadow registers when free and thus delays the real destination writing from the stage 4 to a later one so that the conflict is avoided.

In one embodiment, the approach is dedicated to write after read (WAR) conflicts as illustrated in FIGS. 10A and 10B and write after write (WAW) conflicts as illustrated in FIG. 9. This technique may be used to reduce stall penalty relative to just a subset of the register file, or to the entire set of registers in the microprocessor. If only a subset of registers is chosen, then the number of shadow register in the stack can be determined by analysis of application code that will be executed on the microprocessor. Likewise, the subset of registers that would benefit from this stack can be chosen from an application code study defining where the conflicts are and how often they occur.

Figure 14:
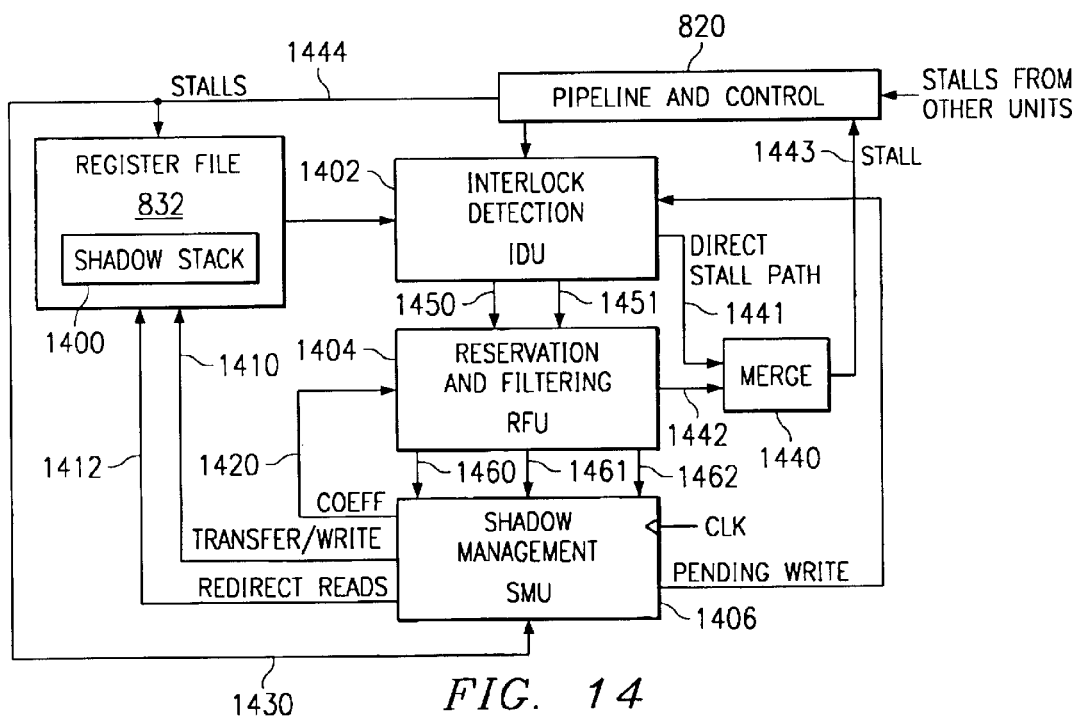
FIG. 14 is a block diagram illustrating shadow registers and control circuitry for delayed writes, according to an aspect of the present invention.

FIG. 14 is a block diagram illustrating shadow registers 1400 and control circuitry for delayed writes, according to an aspect of the present invention. Basically the logic is composed of 3 sub-units: interlock detection unit 1402, reservation and filtering unit 1404, and shadow management unit 1406.

Interlock Detection Unit 1402 contains arbitration circuitry similar to FIG. 13, but with enhancements to identify stalls that can be eliminated by performing a delayed write. Each arbitration logic generates a stall and an expected length (cycle) of stall (worst one). The delayed writes are now taken into account through the transfer signals from the SM-Unit. According to another aspect of the present invention, no added read after write (RAW) dependencies are added by this logic thanks to a read redirection mechanism.

Reservation and Filtering Unit 1404 selects a free shadow register from shadow register stack 1400 to receive a conflicting write. This unit is composed of a K cascaded fast filter (using carry lookahead adder (CLA) type architecture) and destination/stall-length encoding circuitry, where K is the number of shadow registers.

Shadow Management Unit 1406 receives and saves the destinations and stall length information. It generates controls for register file 832 to redirect the writes 1410, to swap the shadow content to the destination 1410, and to redirect the reads 1412. Coefficient signals 1420 are sent to filters 1404. Stall signals 1430 identifying all the stalls from stage 4 to 7 are received from pipeline and control circuitry 820 in order to remain synchronous with the pipeline pace.

A set a shadow registers 1400 with muxing data busses is included in register file 832.

Merge circuitry 1440 receives direct stall signals 1441 and filtered stall signals 1442 and forms stall signals 1443 which are sent to pipeline control circuitry 830 to stall the pipeline. Direct stall signals 1441 indicate stalls that can't be eliminated by a delayed write. Filtered stall signals 1442 indicate stalls that could have been eliminated, except that an empty shadow register was not available.

Figure 15:
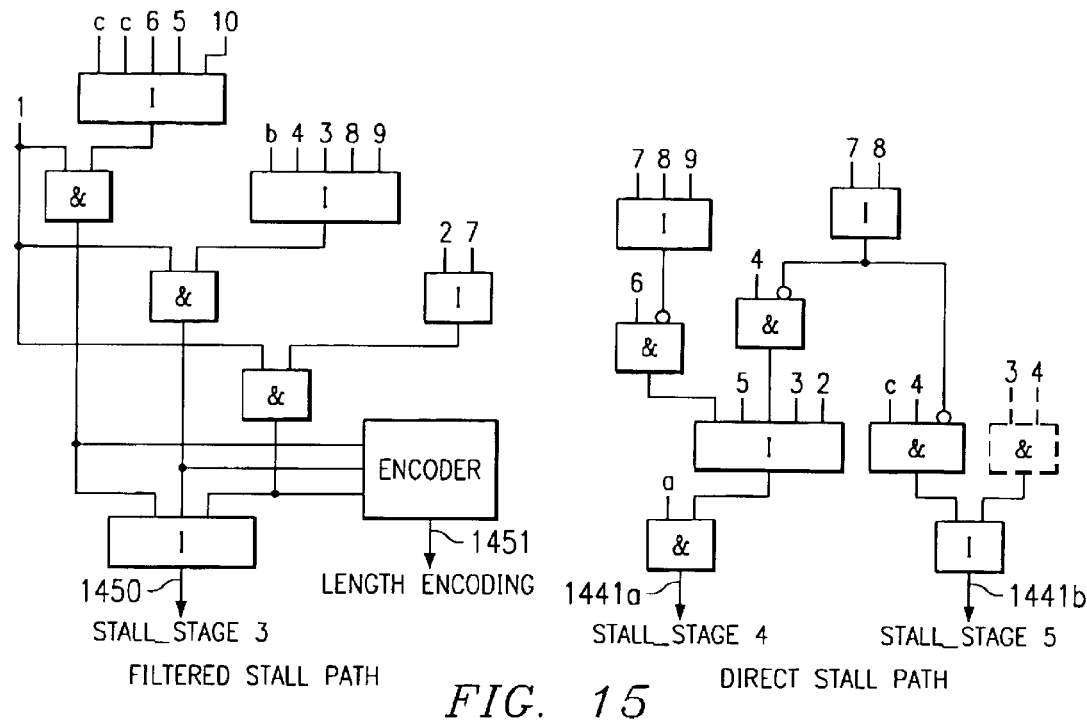
FIG. 15 is a schematic diagram of arbitration circuitry for delayed writes of FIG. 14.

FIG. 15 is a schematic diagram of arbitration circuitry for delayed writes of FIG. 14. Basically the arbitration function is the same as shown in FIG. 13, but split to distinguish the WAW, WAR from the RAW conflicts and also to differentiate the 1,2 or 3 cycles stall length. RAW conflicts are still solved by simple stall and are thus sent directly to the 2nd level of Merge logic. Direct stall signals 1441a and 1441b are asserted for RAW conflicts. Stall vector 1450 and length encoding signal 1451 are sent to filter unit 1404 and indicate when a WAW or a WAR conflict is detected.

The following additional signals are provided to the stall arbitration circuitry:

7: pending stage 3 for stage 6
8: pending stage 3 for stage 5
9: pending stage 5 for stage 6
10: current write from shadow register Additional signals 7–9 allow a stall resulting from a redirected read to be killed. Signal 10 allows a WAW conflict resulting from a delayed write to be detected.

Figure 16:
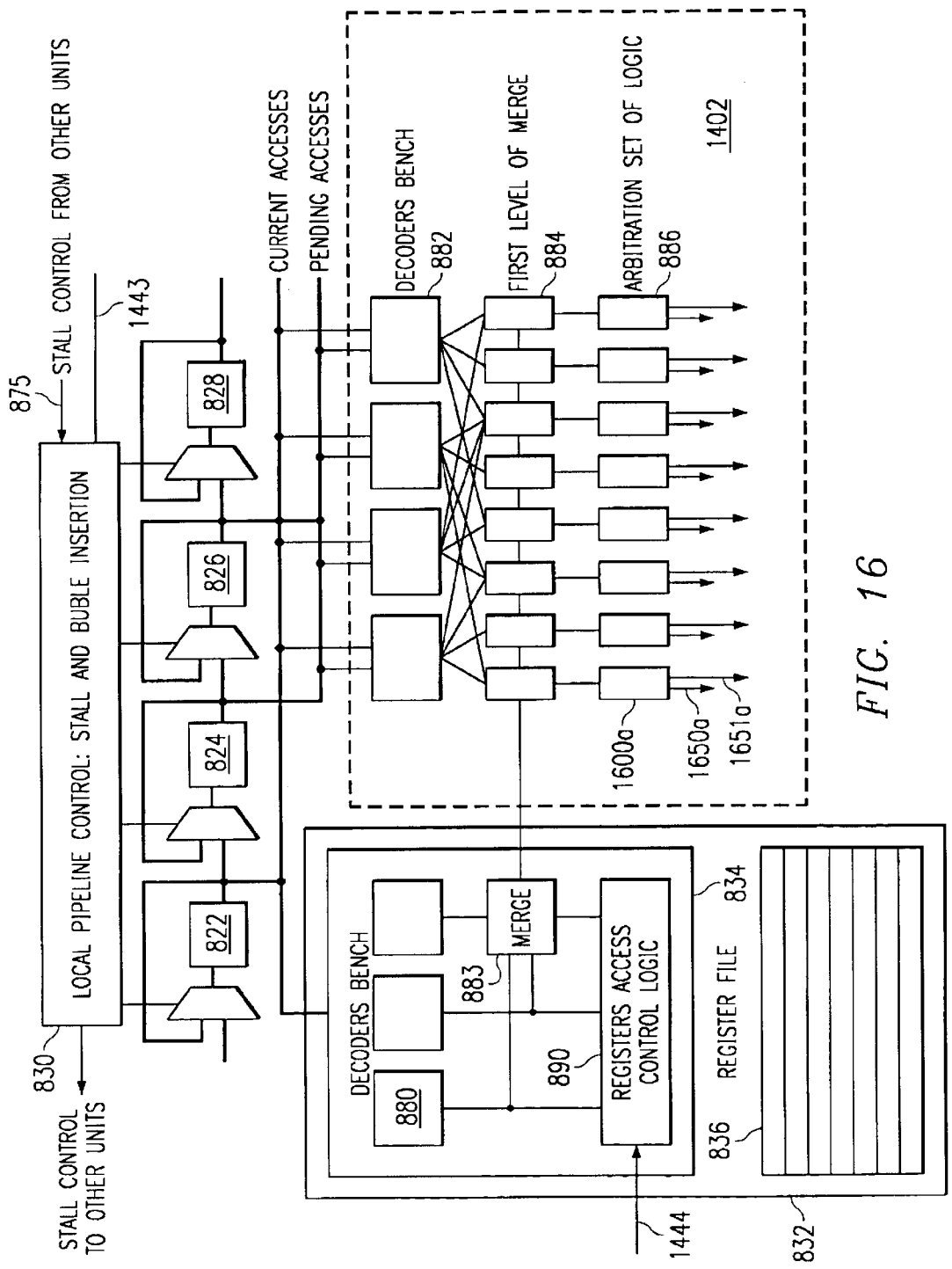
FIG. 16 is a schematic block diagram of an exemplary structure for an interlock control mechanism using the arbitration circuitry of FIG. 15.

FIG. 16 is a schematic block diagram of exemplary structure for an interlock control mechanism 1402 using the arbitration circuitry of FIG. 15, for example, for the pipeline 820 of FIG. 14. It will be understood that the mechanism could have the same structure for other pipelines, such as the pipeline 850 of FIG. 27. It will be noted that no memory elements (read/write queue) are provided for stall management as the instruction pipeline itself is used to achieve this. For example, a write after write conflict from stage P3 to stage P6 of the pipeline between two consecutive instructions should generate a 3 cycle stall (at stage P3). In practice, the interlock logic generates 3×1 cycle consecutive stalls (at stage P3).

FIG. 16 illustrates a regular and parallel structure for hazard detection, including:

A first level comprises basic decoders from pending accesses or current accesses. Decoders 882 are the same as decoders 880 in the register files but are applied on the pending signals. The decoder logic is responsive to access information from at least selected pipeline stages to derive access information for respective protected resources. The decoders 882 are operable to decode pending access information. The decoders 880 are operable to decode current accesses.

A second level comprises a stage 884 of merging of the equivalent signals (in the arbitration function sense) for each register to protect. This is achieved by ORing those signals in OR gates, for example using logic as illustrated in FIG. 13. The output of the decoders 880 for current accesses are merged in merge logic 883, and then are supplied to merge logic 884, where they are merged with the output of the decoders 882 for pending access.

A third level is composed of as many sets of arbitration logic 886 as there are registers to protect. The arbitration logic is extracted from the arbitration function illustrated in FIG. 15, according to the inputs thereto (i.e. it forms a sub-set of the arbitration logic of FIG. 15), and is applied (reduced) to each register access trace. The register access traces are formed from incoming signals specifying an access/phase. Each arbitration circuit 1600a outputs a stall_stage 4 signal 1650a and a length encoding signal 1651a. Thus, a stall vector is formed having a number of bits T equal to the number of target registers that are being detected.

A fourth level is simply the merge 1440 (FIG. 14) of all the arbitration results, for example using OR gates. Each set of arbitration logic generates up to two stalls (at stages 3, and/or 4). All the stalls of the same stage are merged together. The merged output signals are supplied as stall control signals 1443 to the associated pipeline control logic for controlling selective stalling of the pipeline.

The stall control signals 1444 are supplied to register access control logic 834 for current access control. Advantageously, since stall penalty reduction is performed in this embodiment, only conflicts which are not resolved by delayed writes will result in an appropriate pipeline stall, that is a freeze of the lower stages and bubble insertion at the next stage.

The arbitration logic is relatively simple in hardware as a result of its 'logic re-use'. By logic re-use it is meant that the arbitration logic makes use of tapping from the queue of the existing main pipeline 822, 824, 826, 828 (rather than creation of a new queue for arbitration purposes which has been previously proposed) and also makes use of the results from the decoders 880, in the embodiment through the merge logic 883. Consequently, the additional amount of hardware required for the arbitration logic blocks is greatly reduced. In a specific hardware implementation of the embodiment as a DSP integrated circuit, all the arbitration logic covers less than 2% of the total CPU area. By contrast, it is estimated that without logic re-use the chip area required for the logic necessary to provide a comparable level of pipeline protection would be at least several times greater, perhaps an order of magnitude greater.

The concept of the generic arbitration function can be further exploited at the stage of software testing of the hardware design of the processing engine. In general, generating all the test patterns for pipeline processing engine hardware can be a huge undertaking because of the complexity of the CPU, its instruction set and architecture. The test patterns need to be defined in terms of a pre-specified reference. It is the specification of this reference which can be highly laborious. With the present design, a functional test pattern generator can be created using the generic function as the reference in association with a conventional instruction set latency table. This simplifies the creation of the test pattern generator since the scope of the testing can be restricted to the possible conflicts envisaged by the generic function. Because the test pattern generator follows directly from the generic function, the process of hardware design testing is not only quicker, but also more systematic and ensures good coverage.

Figure 17:
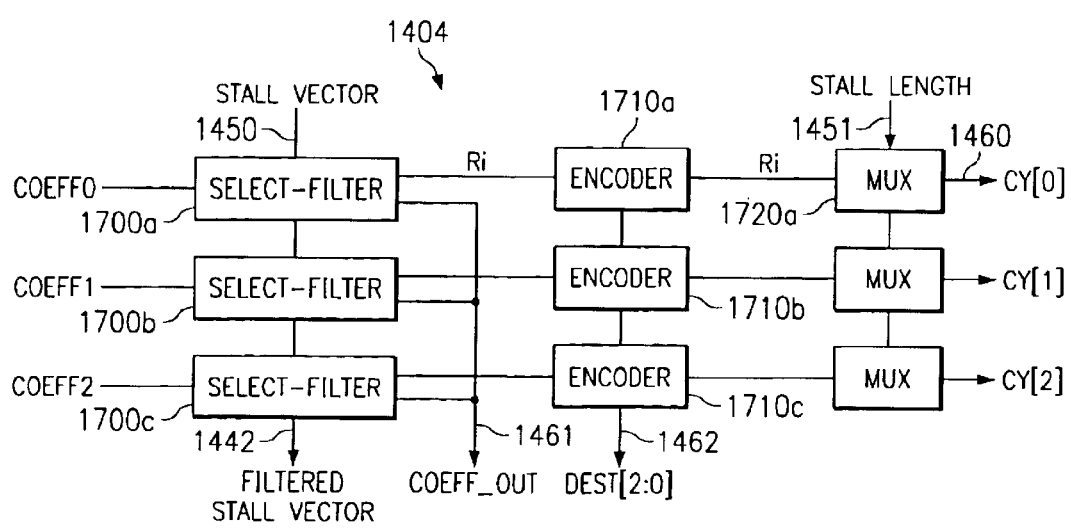
FIG. 17 a block diagram of a reservation and filter circuit for the shadow registers of FIG. 14.

FIG. 17 a block diagram of a reservation and filter circuit 1404 for three shadow registers of FIG. 14. This Unit receives the stalls (WAR-WAW) via stall vector signals 1450 and selects K of them, where K can be 0–3, to be resolved by re-directing the write into a free shadow register. The shadow register will keep this value until the conflict is solved (known by the length information) and then write into the correct destination register. When the stall register has been selected, the corresponding destination code 1462 and stall length cy( ) is encoded and sent to SMU 1406. The selected stall is cleared from stall vector 1450 before being sent to the next Filter stage. After all the filters 1700(n) (as many as there are shadows), the filtered stall vector is sent to the 2nd level of merge 1440 to generate a stall action if shadow registers are busy or if there are more than three conflicts at a time. Other embodiments may have more or fewer shadow registers, in which case, K is selected accordingly.

Each encoder 1710a–c generates a destination code (real target write) from the R[N:0] vector. Table 3 is its truth table.

TABLE 3

Shadow Destination Code Encoding Table

| R[3] | R[2] | R[1] | R[0] | CODE |
|------|------|------|------|------|
| 0    | 0    | 0    | 0    | 000  |
| 0    | 0    | 0    | 1    | 100  |
| 0    | 0    | 1    | 0    | 101  |
| 0    | 1    | 0    | 0    | 110  |
| 1    | 0    | 0    | 0    | 111  | note that the R[i] are exclusive.

In the present embodiment, this approach targets a reduced bench of registers, such as the Auxiliary Registers and Data Registers, in order to minimize the number of shadow registers. In FIG. 16, there are eight arbitration circuits 1600 for eight target registers such that an eight bit stall vector is formed. Filtering is serialized, therefore it is advantageous to use a fast implementation.

If we call

S[i]: the ith bit of the input stall vector

C[i]: the filter coefficient coeff(n) propagated up to the ith bit. (C[o]=1 if the shadow is free)

SF[i]: the filtered value of S[i]

R[i]: a bit selection flag then equations (1), (2), and (3) define how SF{I} and C{I+1} are determined. Table 4 is a truth table which illustrates these relations for four target registers. A different number of target registers is accommodated by similar encodings.

TABLE 4

Select Filter Truth Table

| S[i] | C[i] | SF[i] | C[i + 1] | R[i] |
|------|------|-------|----------|------|
| 0    | 0    | 0     | 0        | 0    |
| 1    | 0    | 1     | 0        | 0    |
| 0    | 1    | 0     | 1        | 0    |
| 1    | 1    | 0     | 0        | 1    |

$$(1)\quad SF[i] = S[i]\ \&\overline{C[i]}$$
$$(2)\quad C[i+1] = \overline{S[i]}\ \&C[i]$$
$$\rightarrow C[i] = \prod_{0}^{i} \overline{S[p]}\ \&C[0]\quad (3)$$

where:

C[0]=1 if the shadow is free

Figure 18:
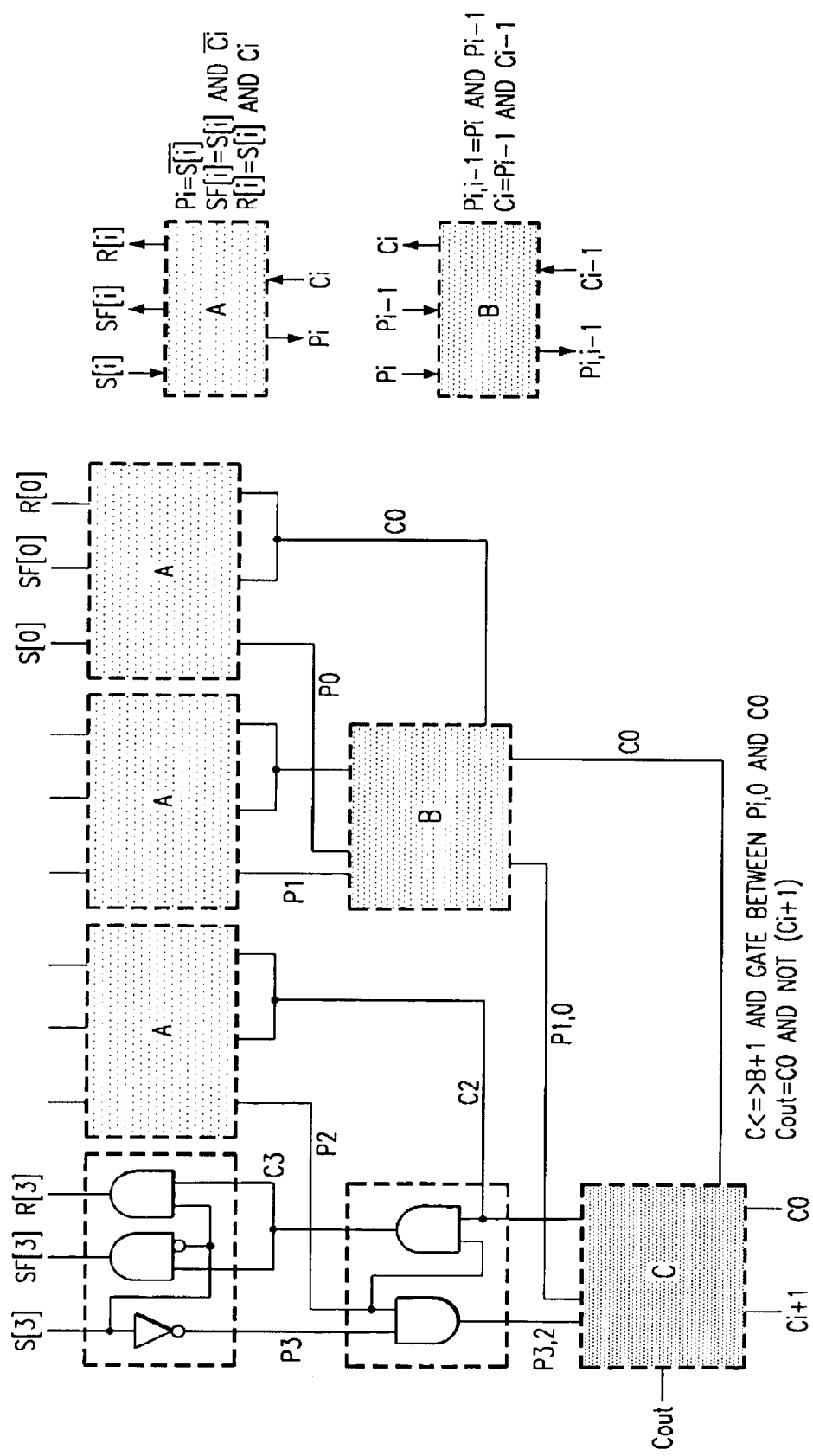
FIG. 18 is a schematic diagram for a lookahead structure for the filter circuit of FIG. 17.

FIG. 18 is a schematic diagram for a lookahead structure for the filter circuit of FIG. 17. This structure is contained within each of the filters 1700a–c. Another embodiment may use a lookahead structure, but with different implementation to improve its speed, such as for example a fast-carry processing CLA. However, as for an adder, any parallel prefix architecture (like CLA, fast-CLA, . . . ) could be used depending on the timing constraints of the design. FIG. 18 illustrates an embodiment for four target registers wherein a four bit stall vector S[3-0 ] is provided.

Figure 19:
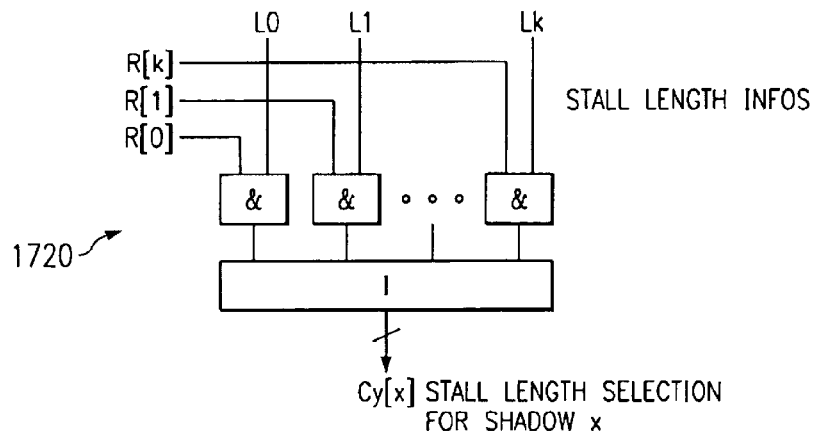
FIG. 19 is a schematic diagram of multiplexor circuitry for stall length selection for the filter circuitry of FIG. 17.

FIG. 19 is a schematic diagram of multiplexor circuitry 1720 for stall length selection for the filter circuitry of FIG. 17. Mux circuitry 1720a is controlled by signals R[i] and selects one stall length L( ) 1451 from among the K inputs. Signals Cy[x] 1460 convey the selected stall length to SMU 1406.

Figure 20:
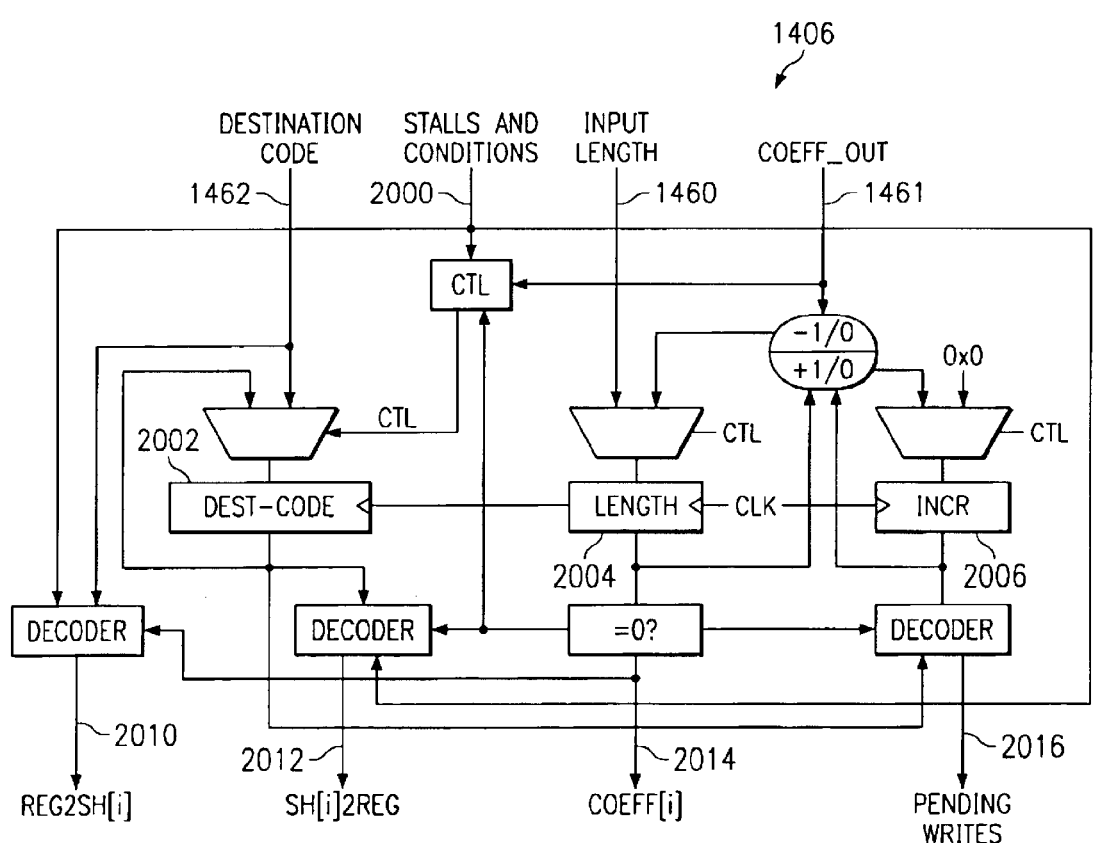
FIG. 20 is a block diagram of shadow management circuitry for the shadow registers of FIG. 14.
Figure 21:
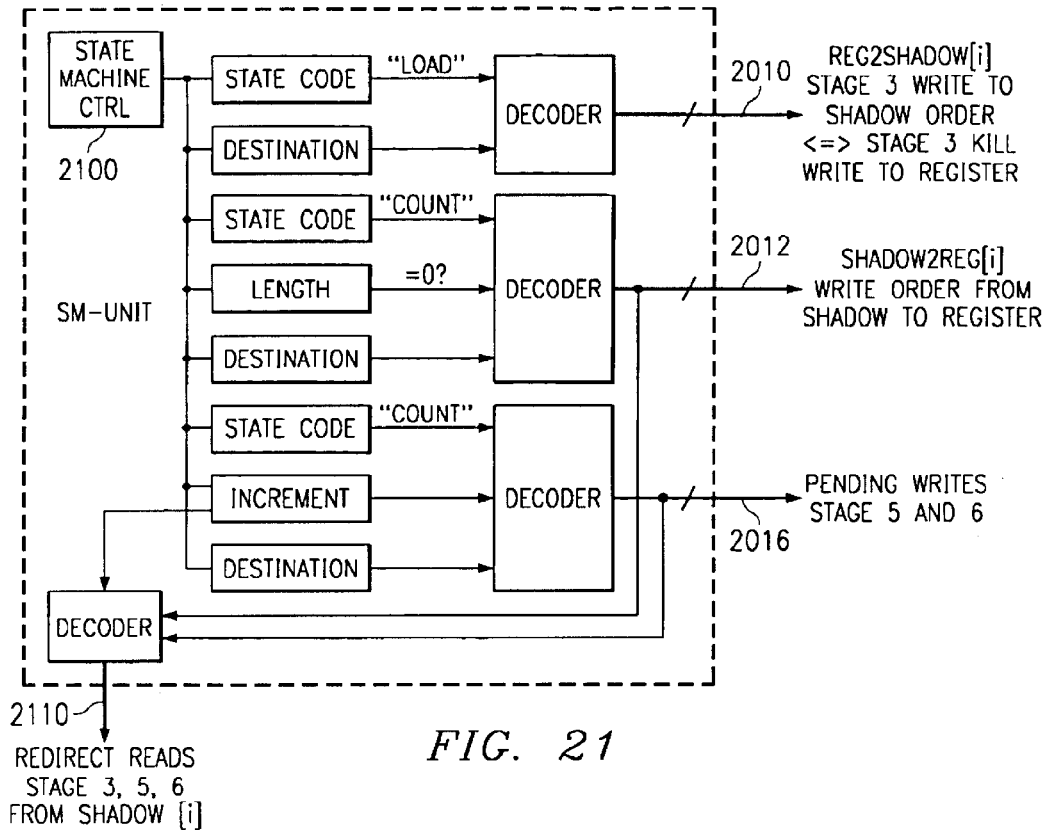
FIG. 21 is a block diagram of the shadow management circuitry of FIG. 20 illustrating the state machine control circuitry.

FIG. 20 is a block diagram of shadow management circuitry 1406 for the shadow registers of FIG. 14. FIG. 21 is a block diagram of the shadow management circuitry of FIG. 20 illustrating the state machine control circuitry 2100.

This unit receives destination signals 1462, cofficient signals 1461, and stall length signals 1460 from RF-Unit 1404, and stall and the write enable signals 2000 (for conditional instructions). Destination register 2002 stores the destination code. Length register 2004 stores the stall length. Increment register 2006 is incremented to form the pending write signals. From those signals, Shadow Management Unit 1406 generates the following signals:

Reg 2 Sh[i] signals 2010: transfer write orders from stage 3 register Reg to shadow[i]. This also causes a write to a conflicted stage 3 register to be killed.

Sh[i]2Reg signals 2012: write order from shadow[i] to a previously conflicted register.

Coeff[i] signals 2014: free shadow[i] signal used as coefficient in RF-unit.

Pending writes signals 2016: sent to ID-unit 1402 to manage conflicts which may arise in stages 4 and 5 as a result of a delayed write from a shadow register.

redirect read signals 2110: orders for stage 3, 5, 6 to the register file. Redirect signals are active at the start of any operative read cycle. In the present embodiment, they are anticipated by one cycle and latched.

Stage 6 writes are not considered because this would still generate conflicts (stalled) with the following reads. In case of 3 cycles delayed write with an instruction performing a stage 6 write, overwrite priority is given to the stage 6 write. Pendings, current writes and redirect read signals are generated as described below. Those signals are sent to Interlock Detection Unit 1402 and to register file 832.

Figure 22:
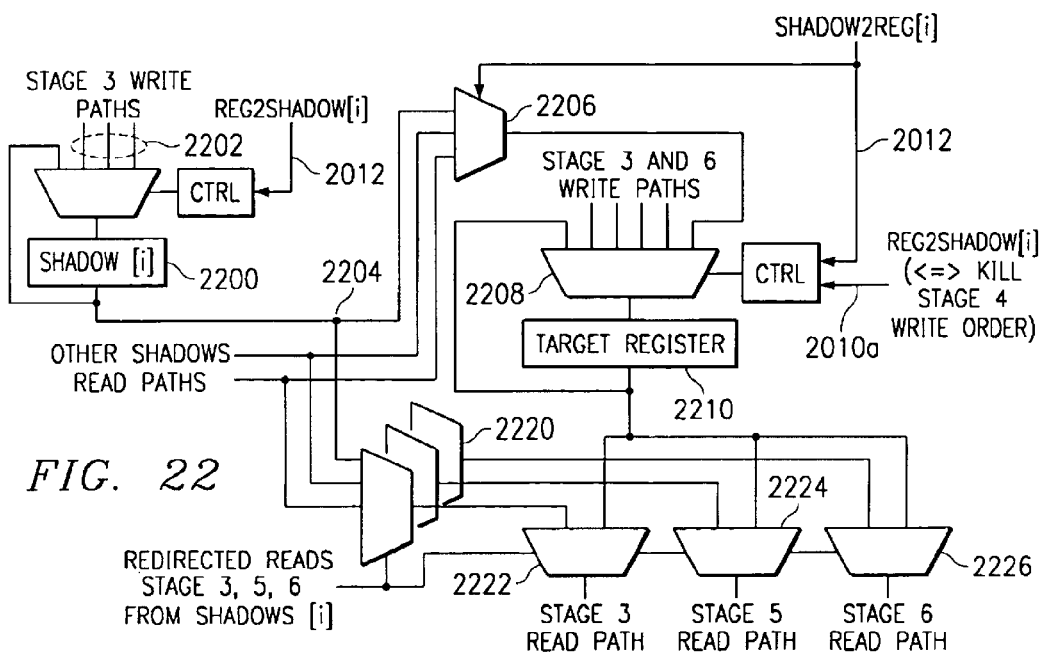
FIG. 22 is a schematic of circuitry for routing data from shadow registers to target registers in the register file of FIG. 14.

FIG. 22 is a schematic of circuitry for routing data from shadow registers to target registers in the register file of FIG. 14. Within the register file a muxed data path is implemented in-between the targeted registers and the shadow registers. Shadow register[i] 2200 is loaded with a data item via stage 3 write paths 2202 in response to control signal reg2shadow[i] 2012 from SMU 1406 when a conflict is detected. On the same cycle, reg2shadow[i] signal 2010a inhibits writing of the data item to target register 2210 so that the detected conflict is killed. The data item is then transferred on a later cycle and written to target register 2210 in response to control signal shadow2reg[i] as a delayed write cycle. Mux 2206 is controlled to select the data item from the selected shadow register 2200 via signal 2204 from a set of shadow registers. Mux 2208 is controlled to select from one of the stage 3-stage 6 write paths or from a shadow register.

Muxes 2220, 2222, 2224 and 2226 are provided to allow a redirected read from a shadow register to a stage 3, stage 5 or stage 6 read path in the case that a data item is not yet written to a target register.

Figure 23:
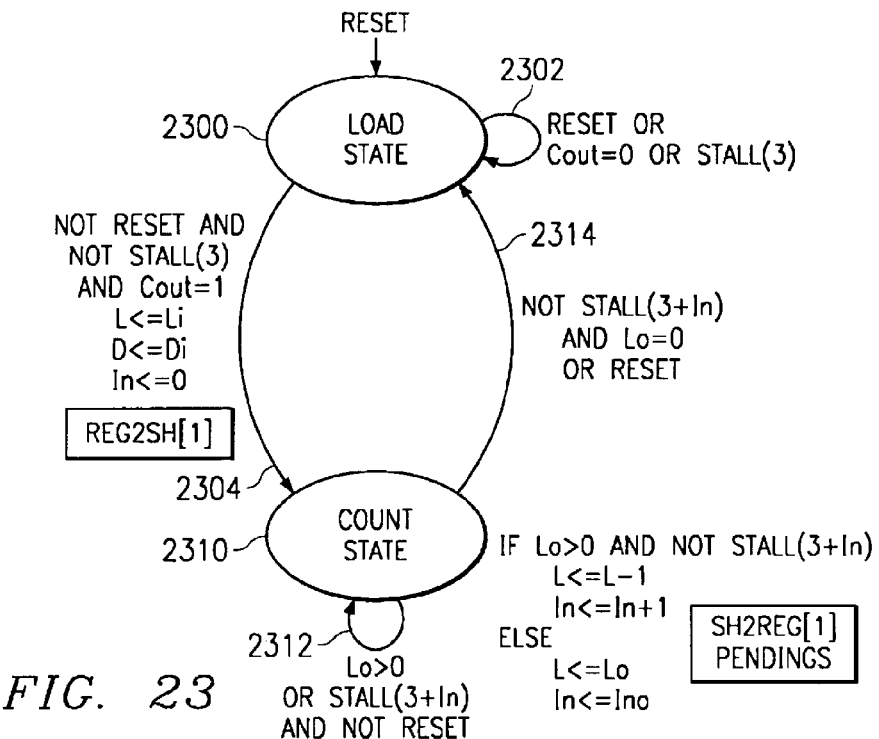
FIG. 23 is a state diagram which illustrates operation of the state machine of FIG. 21.

FIG. 23 is a state diagram which illustrates operation of state machine 2100 of FIG. 21. A separate state machine 2100 is associated with each shadow register. Loop 2302 holds state machine 2100 in load state 2300 during a reset, or when the shadow register associated with state machine 2300 is not selected, as indicated by signal Cout=0, or when stage 3 is stalled as indicated by signal Stall(3). Arc 2304 transitions state machine 2100 to count state 2310 when the associated shadow register is selected (Cout=1). Signal Reg2Shadow[i] 2010 is asserted during this transition. Destination register 2002 and length register 2004 are loaded with data corresponding to the selected conflict. Increment register 2006 is loaded with 0.

In count state 2310, length register 2002 is decremented each clock cycle and increment register 2006 is incremented each clock cycle. Loop 2312 holds the state machine in count state 2310 if length register 2004 is greater than 0, or if a stall is asserted in a stage that is beyond stage 3 by a value equal to the increment register. For example, if the increment register holds a value of 2, then count state 2310 is maintained if stage 5 is stalled. However, in this case, the length register and increment register are not changed. During count state 2310, pending write signals 2016 are asserted. Pending write signals are generated during the Count state using the destination-code and the Increment output (Ino) and sent to the Interlock detection logic to track any further conflicts.

Once the length register reaches a value of 0, arc 2314 moves the state machine back to load state 2300. Signal shadow2reg[i] 2012 is asserted to complete the delayed write of the target register using the contents of the shadow register. Transfer write signal Shadow2Reg[i] is generated using the Destination-code entry and the Length output (Lo).

Delaying the writes solves the WAR and/or WAW conflicts but it also may introduce side effects which must be considered. In the present embodiment three types of side effects are detected and managed, as described in the following paragraphs.

Read redirection is performed so that no RAW conflicts are introduced by the delay logic. Next reads from the Instruction using the delay mechanism MUST use the register value as if the write was done to be consistent with the non-conflicting behavior. This is accomplished by providing data stored in the associated shadow register via the redirect muxes described with respect to FIG. 22.

RAW stalls that may appear when removing the WAW/WAR stalls can also be killed by using read redirection.

WAW conflicts generated by delay write mechanism must be detected. These induced WAW conflicts may also be solved with the delayed write mechanism if a shadow is free.

The next figures show the three contexts of delayed write in the present embodiment, which may be from one to three cycles.

Figure 24A:
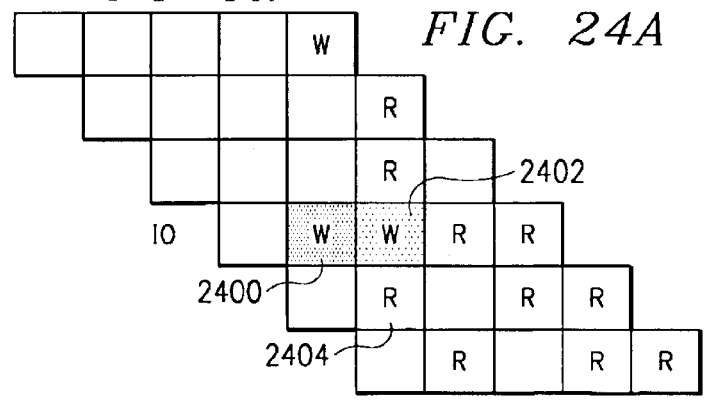
FIG. 24A is a timing diagram illustrating a one cycle write delay and a resulting redirection of a read from a shadow register.

FIG. 24A is a timing diagram illustrating a one cycle write delay and a resulting redirection of a read from a shadow register. Write 2400 is detected as a WAR conflict and delayed, according to aspects of the present invention, for one cycle until 2402. Because of this delay, read 2404 would require RAW stall; advantageously this stall can be killed by read redirection from shadow[i].

Figure 24B:
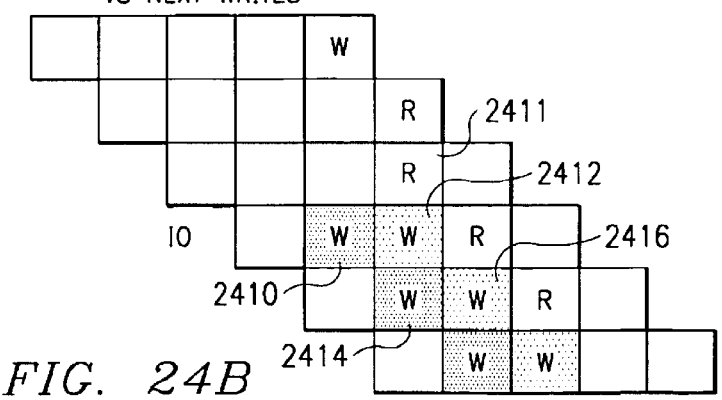
FIG. 24B is a timing diagram illustrating a one cycle write delay in a loop which requires only one shadow register.

FIG. 24B is a timing diagram illustrating a one cycle write delay in a loop which requires only one shadow register. A WAR conflict between write 2410 and read 2411 is resolved by delayed write 2412. However, this induces a WAW conflict with write 2414. Advantageously, this induced WAW conflict can also be resolved by delayed write 2416. Since the delay is only one cycle, only one shadow register is needed to resolve both conflicts.

FIG. 25A is a timing diagram illustrating a two cycle write delay and resulting read redirections from shadow registers in which potential conflicts are killed. A WAR conflict for write 2500 is resolved by two cycle delayed write 2502. A RAW conflict is induced by this for read 2502. This induced conflict is advantageously resolved by a read redirected from shadow[i]. A RAW conflict between write 2510 and read 2512 is also advantageously resolved by a read redirected from shadow[i].

FIG. 25B is a timing diagram illustrating a two cycle write delay in a loop that requires two shadow registers. A WAR conflict between write 2520 and read 2521 is resolved by two cycle delayed write 2522. However, this induces a WAW conflict with write 2524. Advantageously, this induced WAW conflict can also be resolved by delayed write 2526. Since the delay is two cycles, two shadow registers are needed to resolve both conflicts. Conflicts between write 2524 and write 2530, read 2521 and read 2532 are also advantageously resolved by delayed write 2526. Read 2522, and 2526 are also performed without a stall by a read redirected from shadow[i] and shadow[i], respectively. Read 2534 is also performed without a stall by a read redirected from shadow[i].

FIG. 26A is a timing diagram illustrating a three cycle write delay and resulting read redirections from shadow registers in which potential conflicts are killed. A WAR conflict for write 2600 is resolved by three cycle delayed write 2602. A RAW conflict is induced by this for read 2602. This induced conflict is advantageously resolved by a read redirected from shadow[i]. A conflict is also induced by delayed write 2602 for read 2604. This induced conflict is advantageously resolved by a read redirected from shadow [i]. A RAW conflict between writes 2610 and 2611 and read 2602 is also advantageously resolved by a read redirected from shadow[i]. Induced RAW conflicts for read 2614 and read 2616 are also advantageously resolved by reads redirected from shadow[i].

FIG. 26B is a timing diagram illustrating a three cycle write delay in a loop such that three shadow registers are required. A WAW conflict between write 2620 and write 2640 is resolved by three cycle delayed write 2622. However, this induces a WAW conflict with write 2624 and write 2626. Advantageously, these induced WAW conflicts can also be resolved by delayed write 2622. Since the delay is three cycles, three shadow registers are needed to resolve the three conflicts. A conflict between write 2640 and read 2623 is also advantageously killed by delayed write 2622. Read 2622, 2628 and 2630 are also performed without a stall by a read redirected from shadow[i], shadow[j] and shadow[k], respectively.

Figure 27:
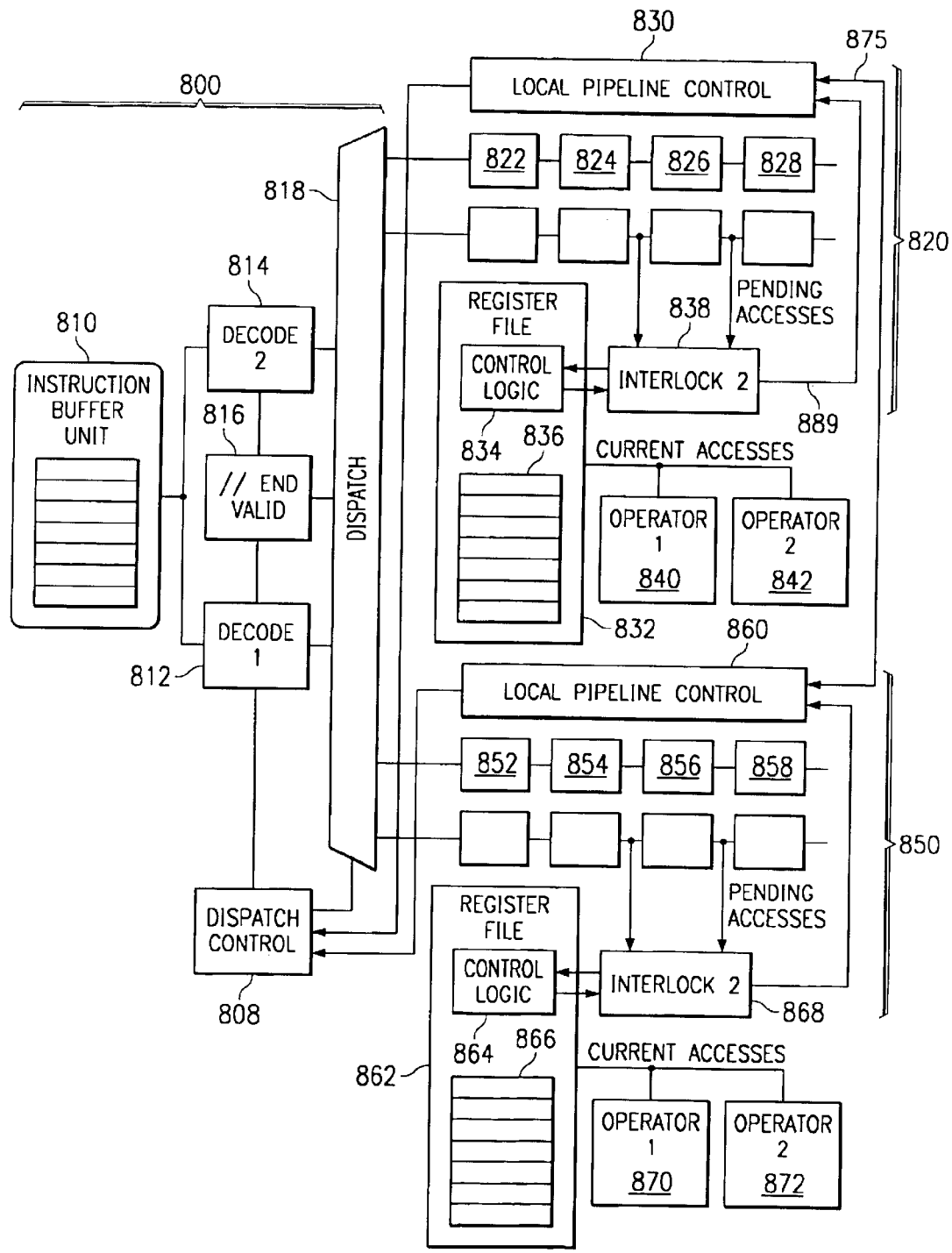
FIG. 27 illustrates the architecture of a dual-pipeline arithmetic logic unit of a processing engine incorporating an embodiment of the invention.

FIG. 27 illustrates the architecture of a dual-pipeline arithmetic logic unit of a processing engine incorporating an embodiment of the invention. As shown in FIG. 27, there are first and second pipelines 820 and 850, receiving instructions from a control flow 800. In terms of FIG. 2, the first pipeline could be the D unit and the second pipeline could be the A unit, for example.

The control flow includes an instruction buffer 810 and first and second decoders 812 and 814, for decoding first and second instruction streams. A parallel encoding validity check is effected in parallel verification logic 816, to ensure that the parallel context is valid. The instructions from the decoders 812 and 814 are dispatched from dispatch logic 818 under the control of a dispatch controller 808.

In the first pipeline 820, successive pipeline stages 822, 824, 826 and 828 are under the control of a local pipeline controller 830. Associated with the first pipeline 820 is first local interlock/filter/shadow logic 838 forming a first local interlock controller. Interlock/filter/shadow logic 838 includes circuitry similar to IDU 1402, RFU 1404 and SMU 1406. The pipeline controller is responsive to control signals 889 from the associated interlock control logic to cause selective stalling of the pipelines stages. This is responsive to outputs from the pipeline 820 and also to outputs from a register file 832 for the pipeline 820. The register file 832 includes register file control logic 834 and individual registers 836, some of which are shadow registers. Control logic 834 is responsive to interlock/filter/shadow logic 838 to provide delayed writes to selected target registers so that the occurrence of pipeline stalls is advantageously reduced. One or more operators 840 and 842 may be accessed in respect of a current access operation.

In the second pipeline 850, successive pipeline stages 852, 854, 856 and 858 are under the control of a local pipeline controller 860. Associated with the second pipeline 850 is second local interlock/filter/shadow control logic 868 forming a second local interlock controller. The pipeline controller is responsive to control signals from the associated interlock control logic to cause selective stalling of the pipeline stages. This is responsive to outputs from the pipeline 850 and also to outputs from a register file 862 for the pipeline 850. The register file 862 includes register file control logic 864 and individual registers 866, some of which are shadow registers. Control logic 864 is responsive to interlock/filter/shadow logic 868 to provide delayed writes to selected target registers so that the occurrence of pipeline stalls is advantageously reduced. One or more operators 870 and 872 may be accessed in respect of a current access operation.

It will be noted that each of the local pipeline controllers 830 and 860 is responsive to outputs from each of the local interlock controllers 838 and 868 by means of signal 875 which spreads a stall generated by any interlock controller to other pipeline controllers. This general principle is extendible. Accordingly, where more than two pipelines are provided, the local pipeline controller for each pipeline will be responsive to the outputs from all of the local interlock controllers.

Thus, in FIG. 27, the natural partitioning of the interlock control is the same as for the register files. However, this need not be the case and it may be desirable to move an individual interlock control (e.g., 838 or 868) from its original register file to another depending on the arbitration function information location (pending verses current accesses).

As mentioned above, in the present embodiment, there are three register files, namely for the control flow (CF), for the D unit (DU) and for the A unit (AU). Accordingly three sets of local interlock control logic are provided. The physical location of the control logic is, however, distributed such that pending and/or current accesses information is mainly located at the respective location (AU,CF). For the D unit, the interlock logic is moved to the control flow unit, where the biggest percentage of signals for control is pending in the instruction pipeline. By re-using as much as possible current accesses of the register files the logic overhead can be minimized. Stalls which are generated are spread within all the CPU sub-units having a pipeline and the associated local pipeline control logic. Advantageously, according to aspects of the present invention, conflicts that are resolved by delayed writes through shadow registers do not generate stalls.

There has been described herein a pipeline protection mechanism which, as a result of its regularity and generality is straightforward to implement and to test. Queuing of read/write pending operations is handled by the pipeline itself. Thus the interlock detection logic is purely combinatorial and does not require a read/write queue as part of the interlock mechanism.

Figure 28:
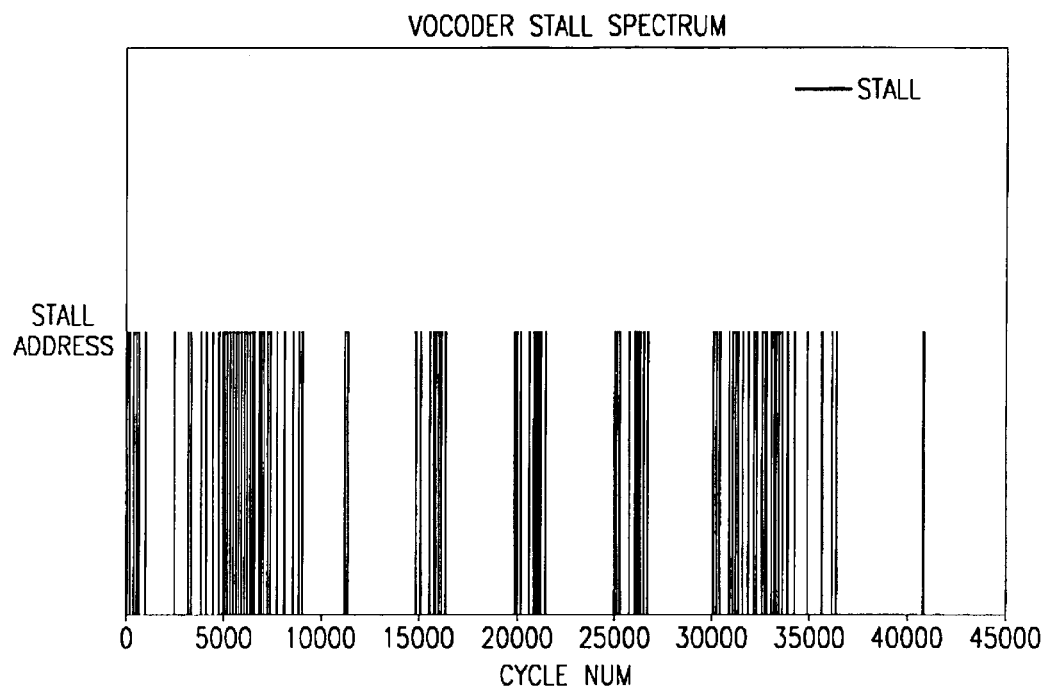
FIG. 28 is a spectrum chart illustrating stalls in a typical application using the circuitry of FIG. 12.

FIG. 28 is a spectrum chart illustrating stalls in a typical application using the circuitry of FIG. 12. The application used for this benchmark is a vocoder code applied on a set of 4 frames (45Kcycles). FIG. 28 illustrates the stage 4 stall frequency during the code execution.

Figure 29:
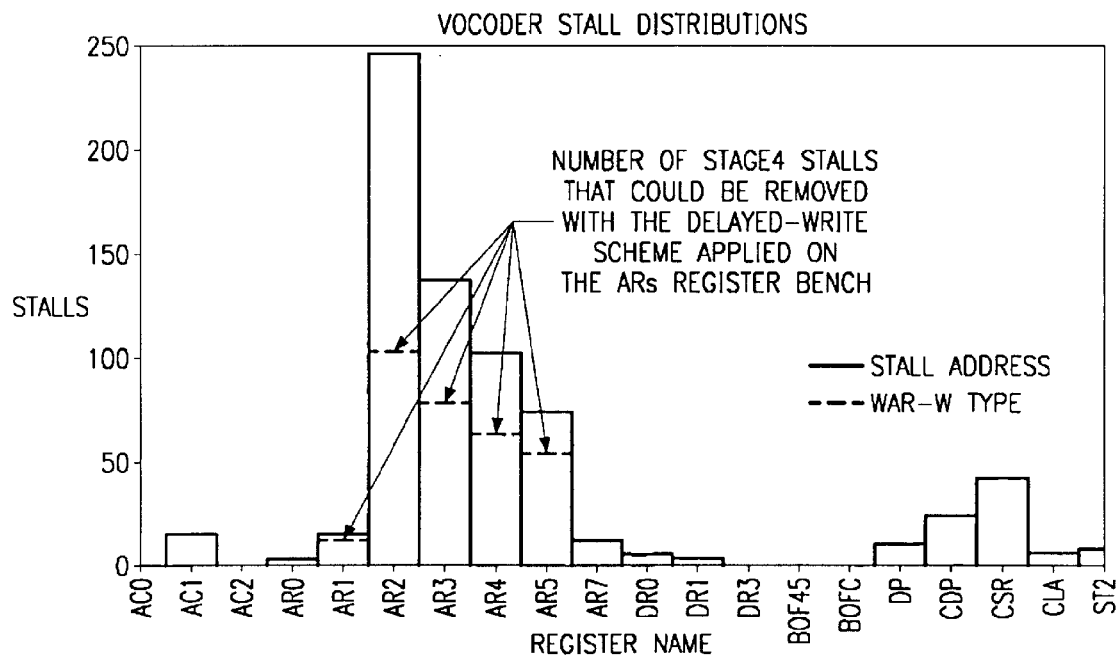
FIG. 29 is a distribution chart illustrating stalls that can be removed from the application of FIG. 28 using the circuitry of FIG. 14.

FIG. 29 is a distribution chart illustrating stalls that can be removed from the application of FIG. 28 using the circuitry of FIG. 14. FIG. 29 illustrates the same stalls distributed in-between the internal registers, making the distinction between the RAW and the WAW/WAR conflicts. From this it can be determined that up to 50% of those conflicts are solved without bubble insertion using circuitry according to aspects of the present invention.

Figure 30:
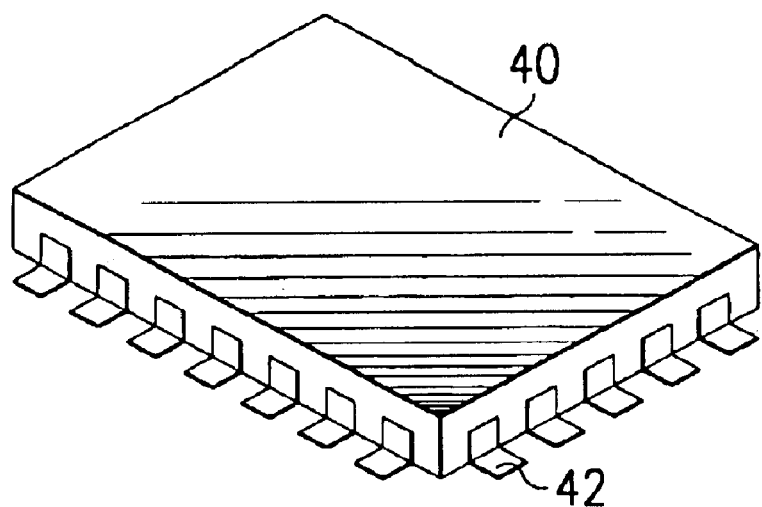
FIG. 30 is an integrated circuit incorporating the processor of FIG. 1.

FIG. 30 is a schematic representation of an integrated circuit 40 incorporating the processor 10 of FIG. 1. The integrated circuit can be implemented using application specific integrated circuit (ASIC) technology. As shown, the integrated circuit includes a plurality of contacts 42 for surface mounting. However, the integrated circuit could include other configurations, for example a plurality of pins on a lower surface of the circuit for mounting in a zero insertion force socket, or indeed any other suitable configuration.

Figure 31:
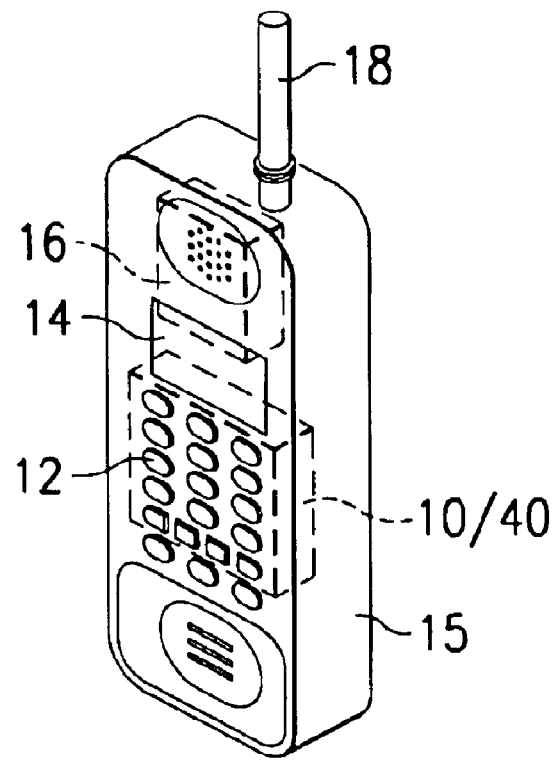
FIG. 31 is an example of mobile telecommunications apparatus incorporating the processor of FIG. 1.

One application for a processing engine such as the processor 10, for example as incorporated in an integrated circuit as in FIG. 31, is in a telecommunications device, for example a mobile wireless telecommunications device. FIG. 31 illustrates one example of such a telecommunications device. In the specific example illustrated in FIG. 31, the telecommunications device is a mobile telephone 15 with integrated user input device such as a keypad, or keyboard 12 and a display 14. The display could be implemented using appropriate technology, as, for example, a liquid crystal display or a TFT display. The processor 10 is connected to the keypad 12, where appropriate via a keyboard adapter (not shown), to the display 14, where appropriate via a display adapter (not shown), and to a telecommunications interface or transceiver 16, for example a wireless telecommunications interface including radio frequency (RF) circuitry. The radio frequency circuitry could be incorporated into, or separate from, an integrated circuit 40 comprising the processor 10. The RF circuitry 16 is connected to an aerial 18.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

Thus, there has been described a processor that is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit, and a data computation unit for executing the instructions decoded by the instruction buffer unit. Instructions can be executed in a parallel manner, either in response to implicit parallelism or in response to user defined parallelism.

Pipeline conflicts are detected as they occur and many of the detected conflicts are resolved by use of a set of shadow registers to provide delayed writing to conflicted target registers. Reads may be redirected to a selected shadow register to resolved conflicts induced by the delayed write.

Another embodiment may have more than two pipelines which are interlocked via stall detection.

Another embodiment may have a larger or a fewer number of target registers that are protected by a set of shadow registers.

Another embodiment may use another technique for detecting pipeline conflicts. However a pipeline conflict is detected, a shadow register may be employed according to an aspect of the present invention to resolve the conflict.

Another embodiment may omit read redirection.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system having a processor comprising a processor pipeline with a plurality of pipeline stages, a plurality of protected resources connected to receive data from certain ones of the plurality of pipeline stages and a pipeline protection mechanism, wherein the pipeline protection mechanism comprises:

a set of shadow registers;

interlock circuitry for anticipating a particular access conflicts for each protected resource of the plurality of protected resources between the pipeline stages, an output of the interlock detection circuitry being controllably connected to the set of shadow registers, the interlock circuitry comprising a stall vector filter, wherein the stall vector filter has a plurality of select filter stages connected in a serial manner such that each of the select filter stages is associated with a corresponding protected resource; and the set of shadow registers being interconnected with the processor pipeline such that a particular data item from a first pipeline stage can be redirected from a protected resource into a selected shadow register only in response to an the particular access conflict anticipated by the interlock circuitry so that a resource access conflict is resolved without stalling the processor pipeline.

2. The digital system according to claim 1, wherein the interlock circuitry comprises:

interlock detection circuitry operable to anticipate access conflicts for all of the protected resources and the stall vector filter operable to form a stall vector signal indicative of anticipated access conflicts;

reservation and stall vector filtering circuitry connected to receive the stall vector signal and operable to select an available shadow register from the set of shadow registers in response to the stall vector signal; and shadow management circuitry connected to the reservation and filtering circuitry, the shadow management circuitry having an output signal controllably connected to the set of shadow registers.

3. The digital system according to claim 1, wherein the interlock circuitry comprises arbitration circuitry for each protected resource such that each arbitration circuit is definable as a specific form of a single, generic arbitration function.

4. The digital system according to claim 1, including pipeline control logic for controlling the stages of the pipeline, the pipeline control logic being connected to receive the stall control signals output from the interlock circuitry based upon a result of arbitration between resources.

5. The digital system according to claim 1, wherein at least one resource is selected from a group consisting of: a group of registers; a register; a field of a register; and a sub-field of a register.

6. The digital system according to claim 1, wherein the set of shadow registers is interconnected with the processor pipeline with multiplexing circuitry operable to redirect a read from a protected resource to a selected shadow register.

7. The digital system of claim 1 being a cellular telephone, further comprising:

an integrated keyboard connected to the processor via a keyboard adapter;

a display, connected to the processor via a display adapter;

radio frequency (RF) circuitry connected to the processor; and an aerial connected to the RF circuitry.

8. The digital system according to claim 1, wherein the processor pipeline is operable to update periodically, and wherein the interlock circuitry is operable to anticipate access conflicts for each protected resource during each pipeline period prior to each periodic update of the processor pipeline.

9. The engine digital system according to claim 8, wherein certain of the plurality of pipeline stages are subject to access conflicts, and wherein the interlock circuitry is connected to receive resource access signals provided by each pipeline stage that is subject to access conflicts, whereby additional control storage circuitry is not required for storing conflict control information.

10. A digital data processor including a processor pipeline with a plurality of pipeline stages and operable upon instructions specifying operands from a plurality of logical registers comprising:

a plurality of physical data registers, each corresponding to fixed respective logical register;

a set of shadow registers;

an interlock detection circuit for anticipating write after read (WAR), write after write (WAW) and read after write (RAW) register access conflicts of instructions between the pipeline stages, said interlock detection circuit generating a stall vector upon detection of a conflict indicating a number of pipeline stages of stall for the detected conflict; and a register control circuit connected to the plurality of physical registers, the set of shadow register and the interlock detection circuit, the register control circuit operable to permit an instruction to access logical registers via the corresponding physical data registers in the absence of detection of a register access conflict, stall an instruction a number of pipeline stages indicated by the stall vector upon detection of a read after write (RAW) register access conflict and thereafter permit the instruction to access logical registers via the physical data registers, and write data to a shadow register upon detection of a write after read (WAR) or write after write (WAW) register access conflict and following expiration of a number of pipeline stages indicated by the stall vector transfer data from the shadow register to the physical data register corresponding to the logical register of a data destination of the instruction.

11. The digital data processor of claim 10, wherein:

the set of shadow registers is less than a maximum number of instructions that can simultaneously cause register access conflicts of instructions between the pipeline stages; and the register control circuit is further operable to write data to a shadow register upon detection of a write after read (WAR) or write after write (WAW) register access conflict if a shadow register is free and following expiration of a number of pipeline stages indicated by the stall vector transfer data from the shadow register to the physical data register corresponding to the logical register of a data destination of the instruction and free the shadow register, and stall an instruction a number of pipeline stages indicated by the stall vector upon detection of a write after read (WAR) or write after write (WAW) register access conflict if no shadow register is free and thereafter permit the instruction to access logical registers via the physical data registers.

12. A method of data processing in digital data processor including a processor pipeline with a plurality of pipeline stages and operable upon instructions specifying operands from a plurality of logical registers, the method comprising the steps of:

detecting write after read (WAR), write after write (WAW) and read after write (RAW) register access conflicts of instructions between the pipeline stages;

upon detecting a register access conflict generating a stall vector indicating a number of pipeline stages of stall for the detected conflict; and in the absence of detection of a register access conflict, permitting an instruction to access logical registers via a fixed corresponding physical data registers;

upon detecting a read after write (RAW) register access conflict, stalling an instruction a number of pipeline stages indicated by the stall vector and thereafter permitting the instruction to access logical registers via the physical data registers; and upon detection of a write after read (WAR) or write after write (WAW) register access conflict, writing data to a shadow register and following expiration of a number of pipeline stages indicated by the stall vector transferring data from the shadow register to the physical data register corresponding to the logical register of a data destination of the instruction.

13. The method of claim 12, wherein the set of shadow registers is less than a maximum number of instructions that can simultaneously cause register access conflicts of instructions between the pipeline stages, the method further comprising the steps of:

upon detection of a write after read (WAR) or write after write (WAW) register access conflict if a shadow register is free writing data to a shadow register and following expiration of a number of pipeline stages indicated by the stall vector transferring data from the shadow register to the physical data register corresponding to the logical register of a data destination of the instruction, and freeing the shadow register; and upon detection of a write after read (WAR) or write after write (WAW) register access conflict if no shadow register is free stalling an instruction a number of pipeline stages indicated by the stall vector, and thereafter permitting the instruction to access logical registers via the physical data registers.

* * * * *